US009020820B2

(12) United States Patent
Hayakawa et al.

(10) Patent No.: US 9,020,820 B2
(45) Date of Patent: Apr. 28, 2015

(54) STATE DETECTING APPARATUS, COMMUNICATION APPARATUS, AND STORAGE MEDIUM STORING STATE DETECTING PROGRAM

(75) Inventors: Shoji Hayakawa, Akashi (JP); Naoshi Matsuo, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 488 days.

(21) Appl. No.: 13/446,019

(22) Filed: Apr. 13, 2012

(65) Prior Publication Data
US 2013/0006630 A1 Jan. 3, 2013

(30) Foreign Application Priority Data

Jun. 30, 2011 (JP) ................................. 2011-146047

(51) Int. Cl.
G10L 15/14 (2006.01)
G10L 17/26 (2013.01)
G10L 15/08 (2006.01)
G10L 25/24 (2013.01)
G10L 25/63 (2013.01)
G10L 25/90 (2013.01)

(52) U.S. Cl.
CPC ................. *G10L 17/26* (2013.01); *G10L 15/08* (2013.01); *G10L 25/24* (2013.01); *G10L 25/63* (2013.01); *G10L 25/90* (2013.01)

(58) Field of Classification Search
CPC ......... G10L 25/48; G10L 25/90; G10L 25/30; G10L 17/26; G10L 15/24
USPC .......... 704/256, 256.2, 254, 251, 245, 257, 9, 704/240, 243, 255, 231, 207; 434/156, 185; 379/88.01–88.03
See application file for complete search history.

(56) References Cited

U.S. PATENT DOCUMENTS

| 6,463,415 | B2* | 10/2002 | St. John ........................ 704/273 |
| 8,204,747 | B2* | 6/2012 | Kato et al. .................... 704/254 |
| 2001/0056349 | A1* | 12/2001 | St. John ........................ 704/270 |
| 2002/0135618 | A1* | 9/2002 | Maes et al. .................... 345/767 |
| 2002/0194002 | A1* | 12/2002 | Petrushin ....................... 704/270 |
| 2003/0033145 | A1* | 2/2003 | Petrushin ....................... 704/236 |
| 2009/0210220 | A1* | 8/2009 | Mitsuyoshi et al. .......... 704/207 |

(Continued)

FOREIGN PATENT DOCUMENTS

| JP | 5-119792 | 5/1993 |
| JP | 8-30290 | 2/1996 |

(Continued)

*Primary Examiner* — Vijay B Chawan
(74) *Attorney, Agent, or Firm* — Staas & Halsey LLP

(57) ABSTRACT

A state detecting apparatus includes: a processor to execute acquiring utterance data related to uttered speech, computing a plurality of statistical quantities for feature parameters regarding features of the utterance data, creating, on the basis of the plurality of statistical quantities regarding the utterance data and another plurality of statistical quantities regarding reference utterance data based on other uttered speech, pseudo-utterance data having at least one statistical quantity equal to a statistical quantity in the other plurality of statistical quantities, computing a plurality of statistical quantities for synthetic utterance data synthesized on the basis of the pseudo-utterance data and the utterance data, and determining, on the basis of a comparison between statistical quantities of the synthetic utterance data and statistical quantities of the reference utterance data, whether the speaker who produced the uttered speech is in a first state or a second state; and a memory.

14 Claims, 17 Drawing Sheets

(56) References Cited

U.S. PATENT DOCUMENTS

2009/0313019 A1* 12/2009 Kato et al. .................... 704/254
2011/0178803 A1* 7/2011 Petrushin ...................... 704/270
2011/0282666 A1* 11/2011 Washio et al. ................ 704/246

FOREIGN PATENT DOCUMENTS

| JP | 2004-317822 | 11/2004 |
| JP | 2008-170820 | 7/2008 |
| JP | 2009-3162 | 1/2009 |

* cited by examiner

FIG. 3

| CONTACT | TELEPHONE NUMBER | |
|---|---|---|
| A | AAA-AAAA-AAAA | |
| B | BBB-BBBB-BBBB | |
| C | CCC-CCCC-CCCC | |

STATE DETECTING APPARATUS, COMMUNICATION APPARATUS, AND STORAGE MEDIUM STORING STATE DETECTING PROGRAM

CROSS-REFERENCE TO RELATED APPLICATION(S)

This application is based upon and claims the benefit of priority of the prior Japanese Patent Application No. 2011-146047, filed on Jun. 30, 2011, the entire contents of which are incorporated herein by reference.

FIELD

The embodiment discussed herein is related to technology that analyzes the state of a speaker who has made an utterance.

BACKGROUND

There exist some technologies that analyzes emotions of a speaker by analyzing the sounds uttered by the speaker. Technology related to analyzing emotions is disclosed in Japanese Laid-open Patent Publication Nos. 2004-317822, 2008-170820, 2009-3162, 08-30290, and 05-119792, for example. Such technology analyzes emotions by using quantities such as the average power of an utterance and its deviation, the average fundamental frequency of an utterance and its deviation, and the timing of silent intervals.

For example, there exists technology that takes prosodic components such as the volume and fundamental frequency as feature parameters of an utterance, and analyzes emotions of a speaker on the basis of how much the feature parameters deviate from statistical quantities for approximately the last second versus statistical quantities for approximately the last five seconds.

There also exists technology that determines whether or not a speaker is in a strained state by determining whether or not periodic fluctuations are observed in the amplitude envelope. Additionally, there exists technology that recognizes the validity of the last speech recognition process by detecting a unique utterance in which the fundamental frequency and power are equal to or greater than given threshold values.

There also exists technology that determines an emergency and conducts a speech recognition process adapted to an emergency upon detecting a case where the fundamental frequency of an utterance is higher than normal, a case where the power of an utterance is larger than normal, or a case where the speed of an utterance is faster than normal.

SUMMARY

According to an aspect of the invention, a state detecting apparatus includes: a processor to execute acquiring utterance data related to uttered speech, computing a plurality of statistical quantities for feature parameters regarding features of the utterance data, creating, on the basis of the plurality of statistical quantities regarding the utterance data and another plurality of statistical quantities regarding reference utterance data based on other uttered speech, pseudo-utterance data having at least one statistical quantity equal to a statistical quantity in the other plurality of statistical quantities, computing a plurality of statistical quantities for synthetic utterance data synthesized on the basis of the pseudo-utterance data and the utterance data, and determining, on the basis of a comparison between statistical quantities of the synthetic utterance data and statistical quantities of the reference utterance data, whether the speaker who produced the uttered speech is in a first state or a second state; and a memory to store the reference utterance data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 illustrates an exemplary data structure for stored contacts list data;

DESCRIPTION OF EMBODIMENTS

Consider detecting that a speaker is in an abnormal state by using technology that analyzes emotions of a speaker on the basis of how much statistical quantities for feature parameters of an utterance deviate from reference values.

As discussed in the field of statistics, a reference statistical quantity for a sample more widely varies from the statistical quantity for the population distribution as the sample size decreases. However, a sample is obtained by extracting a sample from the population distribution. Consequently, with the technology of the related art regarding emotion analysis, large amounts of speech samples of utterances are preferred to sufficiently obtain statistical quantities for the sample, and the reliability of analysis results may lower if there are few speech samples.

Also, with the emotion analysis technology discussed above, reference values may not necessarily express non-abnormal states and it is conceivable that a speaker's abnormal state has been taken as a reference value. In such cases, detection of an abnormal state may fail.

Accurately detecting a speaker's abnormal state is an object of technology according to the present embodiment.

Figure 1:
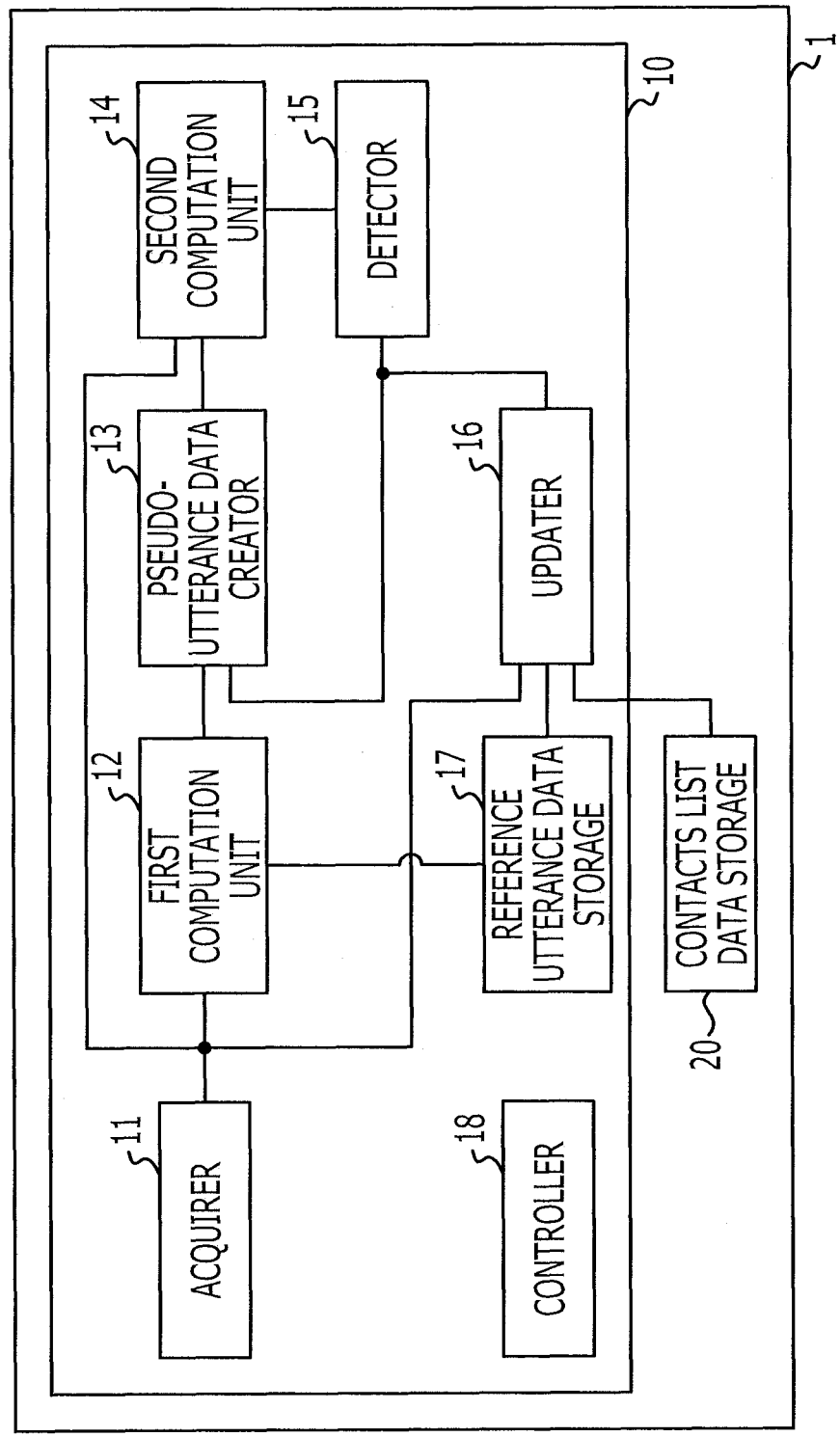
FIG. 1 is a function block diagram of an embodiment of a communication apparatus provided with a state detecting apparatus.

First, a FIG. 1 will be described. FIG. 1 is a function block diagram of an embodiment of a communication apparatus provided with a state detecting apparatus. The communication apparatus 1 in FIG. 1 is provided with a state detecting apparatus 10. The state detecting apparatus 10 analyzes utterance data expressing a speaker's utterances, and detects when the speaker is in an abnormal state.

The state detecting apparatus 10 is provided with an acquirer 11, a first computation unit 12, a pseudo-utterance data creator 13, a second computation unit 14, and a detector 15. The acquirer 11 accepts utterance data input from a microphone, etc. included in the communication apparatus 1.

The first computation unit 12 computes plural statistical quantities for feature parameters from a speaker's utterance data.

Herein, feature parameters are prosodic components, such as fundamental frequency and power. Also, quantities such as the time average and standard deviation of respective feature parameters, for example, are used as the statistical quantities. The pseudo-utterance data creator 13 creates pseudo-utterance data for the statistical quantities for each feature parameter, on the basis of statistical quantities for utterance data and statistical quantities for reference utterance data. Herein, reference utterance data refers to data expressing utterances made by a speaker in a normal state, and for whom an abnormal state is to be detected. Also, among plural types of statistical quantities respectively related to plural feature parameters, some statistical quantities related to pseudo-utterance data match some statistical quantities related to reference utterance data.

The second computation unit 14 respectively synthesizes pseudo-utterance data and utterance data for a plurality of feature parameters. In other words, the second computation unit 14 generates synthetic utterance data for each feature parameters. Additionally, the second computation unit 14 computes statistical quantities related to each feature parameters from synthetic utterance data.

The detector 15 detects if the speaker of utterances expressed by utterance data acquired by the acquirer 11 is in an abnormal state, on the basis of differences in individual statistical quantities for a plurality of feature parameters between synthetic utterance data and reference utterance data.

As discussed above, synthetic utterance data is created by adding pseudo-utterance data to utterance data. Herein, some statistical quantities for feature parameters related to pseudo-utterance data match statistical quantities for reference utterance data. Thus, created synthetic utterance data resembles reference utterance data with respect to the statistical properties of its feature parameters. Consequently, in the case where a speaker whose utterances are expressed by utterance data is in a normal state similar to that of a speaker whose utterances are expressed by reference utterance data, statistical properties may be similar for some of the feature parameters in synthetic utterance data and reference utterance data. In contrast, in the case where a speaker whose utterances are expressed by utterance data is in an abnormal state, statistical properties may differ widely for some of the feature parameters in synthetic utterance data and reference utterance data. Consequently, the detector 15 is able to detect that a speaker whose utterances are expressed by utterance data acquired by the acquirer 11 is in an abnormal state on the basis of differences in statistical quantities for feature parameters between synthetic utterance data and reference utterance data.

Meanwhile, since reference utterance data is generated from a sufficiently large number of samples, fluctuations from the statistical quantities of the population distribution can be reduced. In so doing, statistical properties of feature parameters expressed in synthetic utterance data may be similar to those based on a sufficiently large number of samples, even if the number of samples in the utterance data is small. Consequently, detection of a speaker being in an abnormal state can be accurately conducted.

In this case, the pseudo-utterance data creator 13 creates pseudo-utterance data as follows. The pseudo-utterance data creator 13 matches the time average of the fundamental frequency of utterances expressed by pseudo-utterance data with that of utterances expressed by utterance data. Additionally, the pseudo-utterance data creator 13 matches the standard deviation of this fundamental frequency over time with that of utterances expressed by reference utterance data. Furthermore, the pseudo-utterance data creator 13 matches the time average of the logarithmic power of utterances expressed by pseudo-utterance data with that of utterances expressed by utterance data. Additionally, the pseudo-utterance data creator 13 matches the standard deviation of this logarithmic power over time with that of utterances expressed by reference utterance data. In so doing, the pseudo-utterance data creator 13 creates pseudo-utterance data.

With pseudo-utterance data created in this way, a subset of statistical quantities for its feature parameters match the utterance data, while another subset of statistical quantities for its feature parameters match the reference utterance data.

Also, in this case, the detector 15 conducts the detection discussed above on the basis of the magnitude of the distance between synthetic utterance data and reference utterance data in a two-dimensional space defined by the standard deviation of the fundamental frequency of utterances over time and the standard deviation of the logarithmic power of utterances over time.

This magnitude of the distance is an example of an index that expresses differences between the statistical quantities of feature parameters for synthetic utterance data and the statistical quantities of feature parameters for reference utterance data. However, the detector 15 may also be configured to remove certain utterance data from the basis of detection, namely, utterance data from among the utterance data acquired by the acquirer 11 having feature parameters whose statistical quantities exhibit change over time that is greater that a given first threshold.

Such utterance data with considerably large changes in the above statistical quantities over time is abnormal data, and may be considered to be unsuitable for use in the detection of a speaker in an abnormal state. Thus, the detector 15 preemptively mitigate decreases in detection accuracy by removing such utterance data from the basis of detection discussed above.

Meanwhile, the state detecting apparatus 10 may be additionally provided with an updater 16. The updater 16 uses utterance data to update the statistical quantities of feature parameters for reference utterance data in the case where differences in the statistical quantities of individual feature parameters are less than a given second threshold value between utterance data acquired by the acquirer 11 and reference utterance data.

In the case where the statistical quantities of feature parameters for reference utterance data are updated by the updater 16, the pseudo-utterance data creator 13 creates pseudo-utterance data on the basis of the updated statistical quantities of feature parameters in the reference utterance data. Also, the second computation unit 14 computes statistical quantities of feature parameters for synthetic utterance data on the basis of statistical quantities of feature parameters for pseudo-utterance data and utterance data acquired by the acquirer 11. The detector 15 then conducts the detection discussed above on the basis of the statistical quantities of feature parameters for synthetic utterance data that was computed on the basis of statistical quantities of feature parameters for the updated reference utterance data, and the updated statistical quantities of feature parameters for the reference utterance data.

If the differences in the statistical quantities of individual feature parameters are less than or equal to a given value between the newly acquired utterance data and the reference utterance data, it can be inferred that the speaker whose utterances are expressed by the utterance data is in a state equivalent to the state of the speaker from when the reference utterance data was acquired. In other words, it can be inferred that the speaker of the utterances from which utterance data was acquired is in a non-abnormal state equivalent to a normal state. Because of the updater 16 updating the statistical quantities of feature parameters for reference utterance data using newly acquired utterance data, detection of whether a speaker is in an abnormal state can be conducted using the statistical quantities of feature parameters for up-to-date reference utterance data. Also, it becomes possible to suitably detect an abnormal state for a speaker who has produced speech according to utterance data, even in cases where the person who made utterances when creating reference utterance data is unspecified.

Meanwhile, the state detecting apparatus 10 may be additionally provided with an updater 16 together with reference utterance data storage 17. The reference utterance data storage 17 individually stores statistical quantities of feature parameters for plural types of reference utterance data.

In this case, the updater 16 is configured to use acquired utterance data to update the statistical quantities of feature parameters for the reference utterance data that is minimally different from the utterance data, from among the plural types of reference utterance data stored in the reference utterance data storage 17.

By configuring in this way, statistical quantities of feature parameters can be repeatedly updated to improve the accuracy of detecting if a speaker is in an abnormal state, even in cases where the speaker of utterances expressed by reference utterance data is not the same person as the speaker of utterances in utterance data acquired by the acquirer 11.

Meanwhile, the state detecting apparatus 10 is additionally provided with a controller 18. The controller 18 controls operation of the components of the state detecting apparatus 10. However, the communication apparatus 1 in FIG. 1 may also be provided with contacts list data storage 20 in addition to the state detecting apparatus 10.

The contacts list data storage 20 stores contacts list data, which is information associating contacts with telephone numbers for those contacts. For example, contacts list data is used in a process like the following in the state detecting apparatus 10. When a conversation takes place with a contact included in the contacts list data stored in the contacts list data storage 20, the updater 16 acquires utterance data from the acquirer 11. The updater 16 then uses the acquired utterance data to conduct the update discussed above.

This is because it can be inferred that the speaker is in a non-abnormal state when conversing with a contact included in the contacts list data of the communication apparatus 1. Consequently, by using such utterance data to update the statistical quantities of feature parameters for reference utterance data, the possibility of generating reference utterance data from the utterance data of a speaker in an abnormal state can be reduced.

Figure 2:
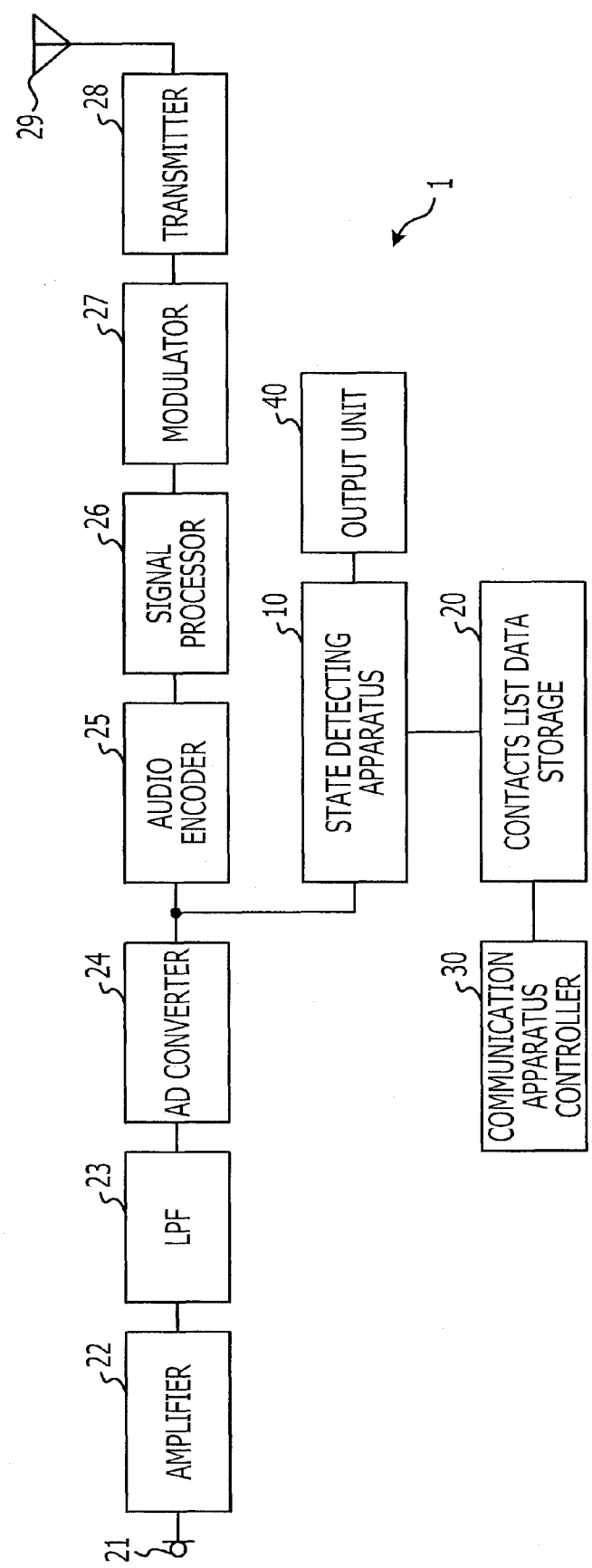
FIG. 2 is an exemplary hardware configuration of an embodiment of the communication apparatus in FIG. 1.

Next, FIG. 2 will be described. FIG. 2 is an exemplary hardware configuration of an embodiment of the communication apparatus 1 in FIG. 1. This communication apparatus 1 is a mobile phone that communicates via a public wireless network. However, FIG. 2 illustrates parts of the configuration of a communication apparatus 1 related to the detection of a speaker's abnormal state by the state detecting apparatus 10, the transmission of audio signals, and the management of contacts list data, while abbreviating or omitting other parts of the configuration.

Regarding the transmission of audio signals, the communication apparatus 1 is provided with a microphone 21, an amplifier 22, an LPF 23, an AD converter 24, an audio encoder 25, a signal processor 26, a modulator 27, a transmitter 28, and an antenna 29.

The microphone 21 picks up sounds uttered by a speaker who is the user of the communication apparatus 1, and outputs an audio signal expressing the uttered sounds. The amplifier 22 amplifies the amplitude of an audio signal output from the microphone 21.

The LPF 23 is a low-pass filter that restricts the frequency bandwidth of an audio signal output from the microphone 21 to frequencies less than or equal to a given frequency. The AD converter 24 is an analog-to-digital converter that samples and quantizes an analog audio signal output from the LPF 23 for conversion into digital data (audio data) expressing the audio signal. Furthermore, the LPF 23 is made to conduct anti-aliasing in order to block aliasing noise produced due to sampling by the AD converter 24.

The audio encoder 25 performs a given audio encoding process on audio data output from the AD converter 24 in order to decrease the data size. The signal processor 26 performs a given baseband signal process on encoded audio data output from the audio encoder 25.

The modulator 27 generates a transmit signal by modulating a high-frequency signal using baseband-processed data from the signal processor 26. The transmitter 28 amplifies a transmit signal output from the modulator 27 and outputs it to the antenna 29.

The antenna 29 delivers a transmit signal output from the transmitter 28 to a base station by emitting it into space as an electromagnetic wave. Also, the communication apparatus 1 is provided with a contacts list data storage 20 and a communication apparatus controller 30 regarding the management of contacts list data.

As discussed earlier, the contacts list data storage 20 stores contacts list data. FIG. 3 will now be described. FIG. 3 illustrates an exemplary data structure for contacts list data stored in the contacts list data storage 20.

As illustrated in FIG. 3, contacts list data individually associates a plurality of contacts with telephone numbers for those contacts. However, other data may be additionally associated with the contact and telephone number data.

Returning to the description of FIG. 2, the communication apparatus controller 30 controls operation of the components constituting the communication apparatus 1, and particularly, manages contacts list data stored in the contacts list data storage 20 (such as adding, deleting, and modifying data).

An output unit 40, upon receiving from the state detecting apparatus 10 a detection result indicating that the speaker is in an abnormal state, outputs the detection result to notify the speaker (i.e., the user of the communication apparatus 1) or another apparatus. More specifically, the output unit 40 may be an LCD that displays information representing the detection result, or a loudspeaker that emits an audible alarm representing the detection result.

Audio data output from the AD converter 24 is input into the state detecting apparatus 10 as utterance data.

Figure 4:
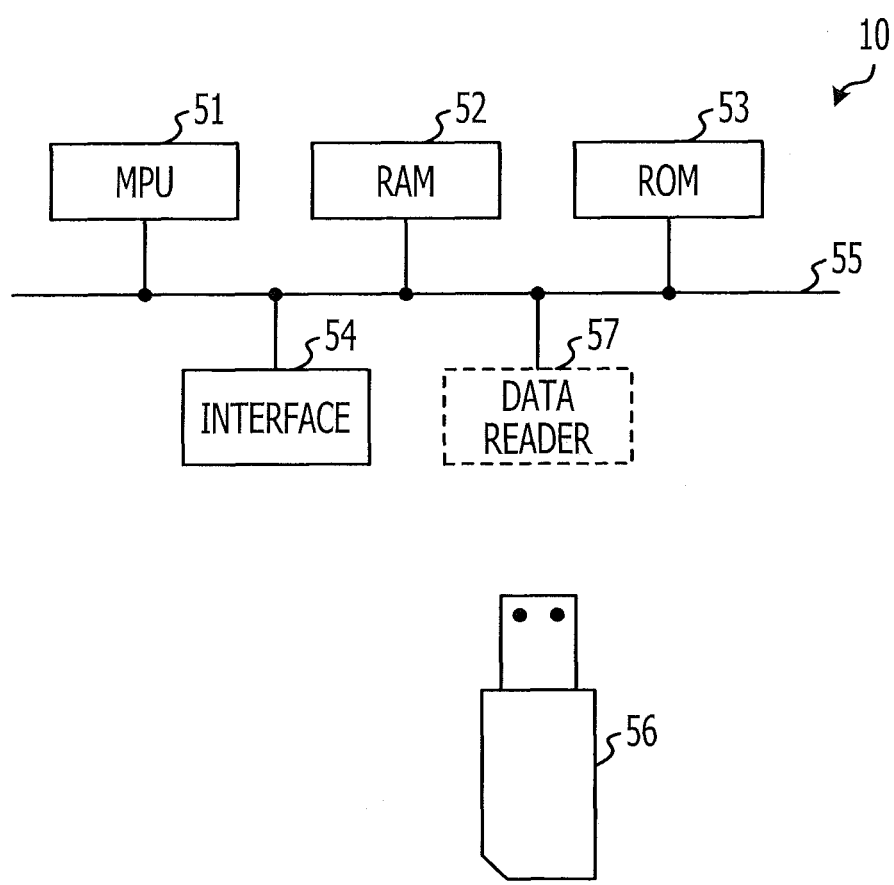
FIG. 4 is an exemplary hardware configuration of an embodiment of a state detecting apparatus.

Next, FIG. 4 will be described. FIG. 4 is an exemplary hardware configuration of an embodiment of a state detecting apparatus. This state detecting apparatus 10 is provided with an MPU 51, RAM 52, ROM 53, and an interface 54. Additionally, these components are connected via a bus line 55, transmitting and receiving various data to each other under management by the MPU 51.

The MPU (Micro Processing Unit) 51 controls overall operation of the state detecting apparatus 10. The RAM (Random Access Memory) 52 is semiconductor memory that can be written to and read from at random, and is used as a work area where appropriate when the MPU 51 executes various control programs.

The ROM (Read-Only Memory) 53 is read-only semiconductor memory storing given a control program and various constants in advance, and may be flash memory, for example. By reading out and executing this control program when the state detecting apparatus 10 is activated, the MPU 51 is able to control the components of the state detecting apparatus 10, and in addition, becomes able to conduct the control processes discussed later. Also, the ROM 53 stores plural types of reference utterance data in advance. By storing such reference utterance data, the ROM 53 provides the functions of the reference utterance data storage 17 in FIG. 1.

The interface 54 manages the exchange of various data with components connected to the state detecting apparatus 10, such as the AD converter 24, contacts list data storage 20, and output unit 40 of the communication apparatus 1. Particularly, the interface 54 acquires audio data output from the AD converter 24 as utterance data, and thus provides the functions of the acquirer 11 in FIG. 1.

The MPU 51 in a state detecting apparatus 10 having such a configuration can be made to function as the first computation unit 12, pseudo-utterance data creator 13, second computation unit 14, detector 15, updater 16, and controller 18 illustrated in FIG. 1. In order to do so, a control program for causing the MPU 51 to conduct the processing operations of a control process discussed later is first created. The created control program is stored in advance in the ROM 53. Then, a given instruction is issued to the MPU 51 to read out and execute the control program. In so doing, the MPU 51 functions as the components discussed above.

In this way, a state detecting apparatus 10 is configured similarly to a normally-equipped computer. Consequently, by causing a normally-equipped computer to provide the functions provided by the components of the state detecting apparatus 10 illustrated in FIG. 1, it is possible to realize a state detecting apparatus 10 with a computer. In this case, a control program for causing the computer to conduct the processing operations of a control process discussed later is stored in advance in a storage device such as a hard disk provided in the computer, for example. Reference utterance data may also be stored in such a storage device. Then, a given instruction is issued to the computer to read out and execute the control program. In so doing, the computer is made to function as the components discussed above.

Also, in order to realize a state detecting apparatus 10 with such a computer, it may be configured such that a control program and reference utterance data is stored in advance in a storage medium 56 as illustrated in FIG. 4. However, the storage medium does not include a transitory medium such as a propagation signal. In this case, the computer is provided with a data reader 57 that reads out programs and data stored in the storage medium 56, as indicated by broken lines in FIG. 4. In this case, a given instruction is first issued to the computer to operate the data reader 57, read out a control program and reference utterance data from the storage medium 56, and temporarily store it in a storage device, and then subsequently read out and execute the control program. In so doing, the computer is made to function as the components discussed above. Herein, flash memory provided with a USB (Universal Serial Bus) reference connector, for example, is usable as the storage medium 56. Also, media such as a CD-ROM (Compact Disc Read-Only Memory) or a DVD-ROM (Digital Versatile Disc Read-Only Memory) are usable as the storage medium 56.

Figure 5:
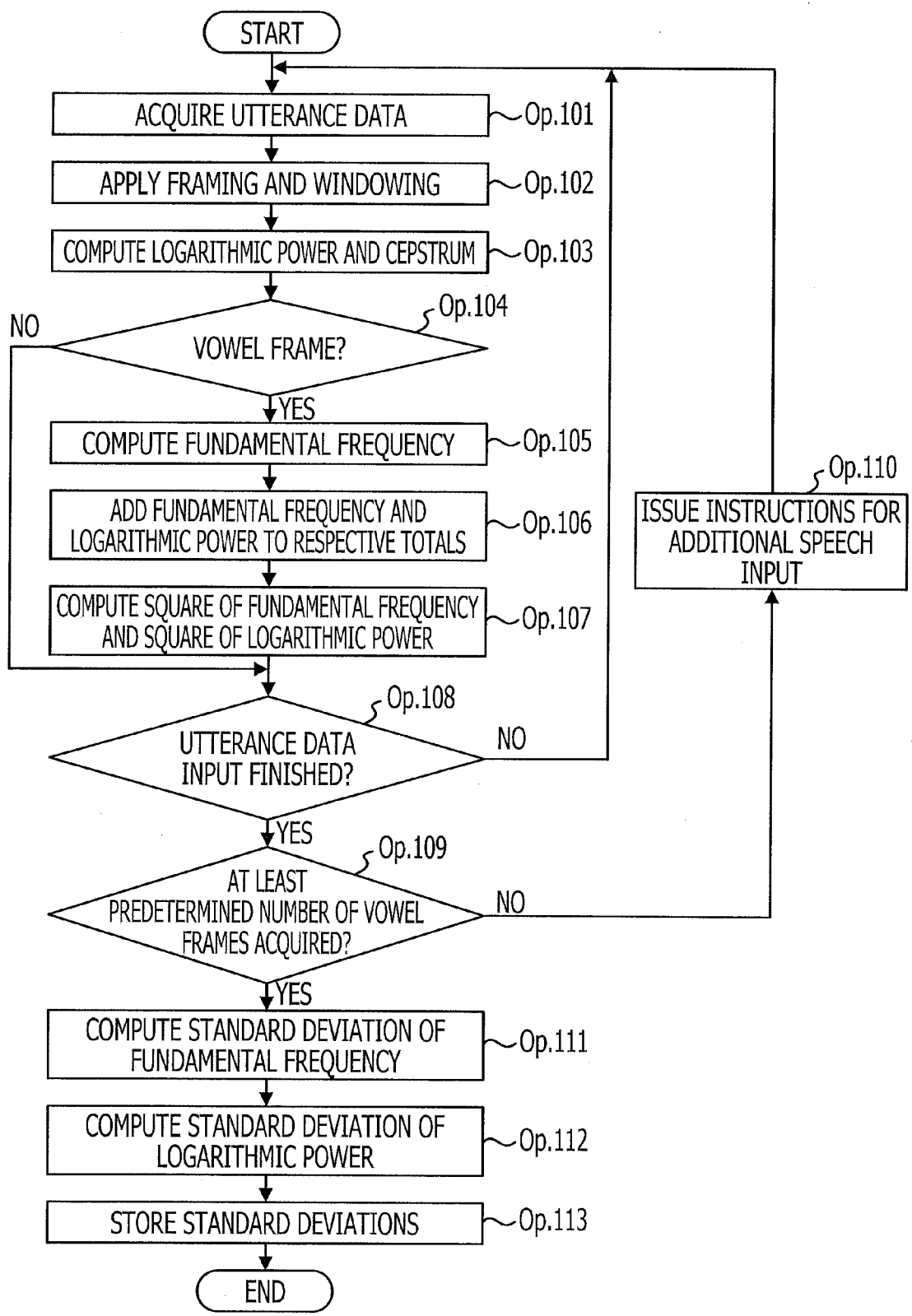
FIG. 5 is a flowchart illustrating processing operations in a reference utterance data statistical quantity registration process.

Next, processes conducted by the components of the state detecting apparatus 10 in FIG. 1 will be described. First, FIG. 5 will be described. FIG. 5 is a flowchart illustrating processing operations in a reference utterance data statistical quantity registration process. The reference utterance data statistical quantity registration process computes and saves statistical quantities of feature parameters expressing features of utterances from data expressing utterances made while the speaker (i.e., the user of the communication apparatus 1) is in a normal state. In this embodiment, the fundamental frequency and logarithmic power of utterances are adopted as such feature parameters.

In FIG. 5, first, in Op. 101, the acquirer 11 acquires utterance data sent from the AD converter 24 of the communication apparatus 1. Next, in Op. 102, the first computation unit 12 conducts framing and windowing of the utterance data.

Framing is a process that divides utterance data given as a time-series digital signal into segments (frames) of a given size (frame length) by which the signal is to be analyzed, with the individual frames overlapping each other according to a fixed interval (frame shift). Framing is ordinarily used in speech information processing and acoustic processing, and settings that take the frame length to be approximately 20 to 40 ms and the frame shift to be approximately 10 to 20 ms are widely used.

Windowing is a process that applies a weight, called an analysis window, to individual frames of utterance data extracted by framing. The Hanning window and the Hamming window, for example, are widely used as such analysis windows.

In Op. 102, an analysis window $w(n)$ of length N samples is applied to an utterance data signal $s(n)$ sent from the AD converter 24 according to the following Eq. 1. By this process, a signal sequence $S_w(n; l)$ for the lth frame is extracted.

$$s_w(n;l)=w(n) \cdot s(lT+n)(n=0, 1, \ldots, N-1) \qquad \text{Eq. 1}$$

Herein, the subscript lT corresponds to the signal extraction position. In other words, by increasing n in $s(n)$ in intervals of the frame shift T, there is obtained a framed signal sequence $S_w(n; l)$ (where n=0 to N−1) for the lth frame to which a window of frame length N has been applied. Also, in this embodiment, a Hamming window expressed by the following Eq. 2 is used as the analysis window.

$$w(n) = 0.54 - 0.46\cos\left(\frac{2n\pi}{N-1}\right) \quad (n = 0, 1, \ldots, N-1) \qquad \text{Eq. 2}$$

Next, in Ops. 103 and 104, it is determined whether or not the signal sequence for the lth frame obtained in Op. 102 expresses a vowel utterance. This is because it is preferable to extract frames containing vowel utterances from among frames obtained in Op. 102, since the fundamental frequency of an utterance which is adopted as a feature parameter in this embodiment may not be suitably computed if an utterance does not contain a vowel sound.

First, in Op. 103, the first computation unit 12 computes feature parameters which can be used to detect vowel frames from the signals of frames obtained in Op. 102. In this embodiment, the first computation unit 12 computes the logarithmic power and cepstrum of signal sequences included in frames.

First, the logarithmic power value power(l) of the signal sequence $S_w(n; l)$ for the lth frame is computed according to the following Eq. 3.

$$\text{power}(l) = 10 \log_{10}\left\{\sum_{n=0}^{N-1} s_w(n; l)^2\right\} \qquad \text{Eq. 3}$$

Next, the first computation unit 12 applies an FFT (fast Fourier transform) to the signal sequence $S_w(n; l)$ for the lth frame, converts the obtained power spectrum into a logarithmic power spectrum, and then applies an IFFT (inverse fast Fourier transform) to compute the cepstrum.

Next, in Op. 104, the controller 18 determines on the basis of the computed feature parameters whether or not a frame obtained in Op. 102 is a vowel frame, or in other words, whether or not the signal sequence $S_w(n; l)$ of the lth frame expresses a vowel utterance.

In this embodiment, the lth frame is determined to be a vowel frame in the case where the logarithmic power value of the signal sequence exceeds a given power value and also where the peak value in a given high-quefrency region in the cepstrum of the signal sequence exceeds a given peak threshold. In contrast, the lth frame is determined to not be a vowel frame in cases other than the above.

In the determination in Op. 104, the controller 18 proceeds to Op. 105 upon determining that the lth frame is a vowel frame. In contrast, the controller 18 proceeds to Op. 108 upon determining that the lth frame is not a vowel frame.

However, the determination of whether or not a frame is a vowel frame may also be configured to use other techniques. In other words, it may be configured such that a vowel frame is determined by using the peak of the autocorrelation function or the peak of the modified autocorrelation function for a vowel frame, for example.

Also, in Op. 103 discussed above, it is configured such that the logarithmic power of a signal sequence included in a frame is computed in the time domain using Eq. 3 above. However, it may be instead configured such that the logarithmic power is computed from the total power spectrum after applying the FFT in order to compute the cepstrum.

Next, in Op. 105, the first computation unit 12 computes the fundamental frequency of a vowel frame signal. The fundamental frequency may be computed by computing the quefrency value at the maximum peak in the cepstrum of the vowel frame, and then taking the reciprocal of this value.

Next, in Op. 106, the first computation unit 12 adds the logarithmic power of a vowel frame that was computed in Op. 103 to a cumulative total of the logarithmic power of vowel frames detected thus far. Additionally, the first computation unit 12 adds the fundamental frequency of a vowel frame that was computed in Op. 105 to a cumulative total of the fundamental frequency of vowel frames detected thus far.

Next, in Op. 107, the first computation unit 12 adds the square of the logarithmic power of a vowel frame that was computed in Op. 103 to a cumulative total of the square of the logarithmic power of vowel frames detected thus far. Also, the first computation unit 12 adds the square of the fundamental frequency of a vowel frame that was computed in Op. 105 to a cumulative total of the square of the fundamental frequency of vowel frames detected thus far.

Next, in Op. 108, the controller 18 determines whether or not the input of utterance data from the AD converter 24 of the communication apparatus 1 has finished. The controller 18 proceeds to Op. 109 upon determining that the input of utterance data has finished. In contrast, the controller 18 returns to Op. 101 and causes the acquirer 11 to acquire subsequent utterance data upon determining that the input of utterance data has not yet finished at this point.

Next, in Op. 109, the controller 18 determines whether or not the number of vowel frames obtained since starting the reference utterance data statistical quantity registration process equals or exceeds a given, preset number. At this point, the controller 18 proceeds to Op. 111 in the case where the number of acquired vowel frames equals or exceeds the given number. In contrast, the controller 18 proceeds to Op. 110 in the case where the number of acquired vowel frames does not satisfy the given number at this point.

In Op. 110, the controller 18 issues a given instruction to the output unit 40 of the communication apparatus 1 to output a given notification prompting the user of the communication apparatus 1 to make additional utterances. For example, given visual information prompting additional utterances may be displayed on an LCD. After that, the controller 18 returns to Op. 101 and causes the acquirer 11 to acquire subsequent utterance data. Meanwhile, although the number of vowel frames used as the basis for the determination in Op. 109 is set to be a number of frames equivalent to 60 s of time in this embodiment, other values may also be used.

Next, in Op. 111, the first computation unit 12 computes the standard deviation of the fundamental frequency on the basis of all acquired vowel frames. First, the first computation unit 12 computes the average by dividing the cumulative total of the fundamental frequency by the number of acquired vowel frames. This average is equivalent to the time average of the fundamental frequency. Next, the first computation unit 12 computes the second moment by dividing the cumulative total of the square of the fundamental frequency by the number of acquired vowel frames. Then, the first computation unit 12 computes the standard deviation using the average and the second moment. This standard deviation is equivalent to the standard deviation of the fundamental frequency over time.

Next, in Op. 112, the first computation unit 12 computes the standard deviation of the logarithmic power on the basis of all acquired vowel frames. First, the first computation unit 12 computes the average by dividing the cumulative total of the logarithmic power by the number of acquired vowel frames. This average is equivalent to the time average of the logarithmic power. Next, the first computation unit 12 computes the second moment by dividing the cumulative total of the square of the logarithmic power by the number of acquired vowel frames. Then, the first computation unit 12 computes the standard deviation using the obtained average and the second moment. This standard deviation is equivalent to the standard deviation of the logarithmic power over time.

Next, in Op. 113, the controller 18 causes the reference utterance data storage 17 of the communication apparatus 1 to store and save the respective standard deviations of the fundamental frequency and logarithmic power computed in Ops. 111 and 112 as statistical quantities for respective feature parameters of reference utterance data. After that, the reference utterance data statistical quantity registration process ends.

The reference utterance data statistical quantity registration process is conducted while the user of the communication apparatus 1 is conversing in a normal state, for example. A conversation in a normal state may be also be recorded and the reference utterance data statistical quantity registration process executed after the conversation ends. Also, the reference utterance data statistical quantity registration process is preferably conducted on utterance data from conversations made in as normal a state as possible. Thus, it may be configured such that the reference utterance data statistical quantity registration process is only conducted on utterance data from conversations with contacts included in the contacts list data discussed earlier.

Figure 6A:
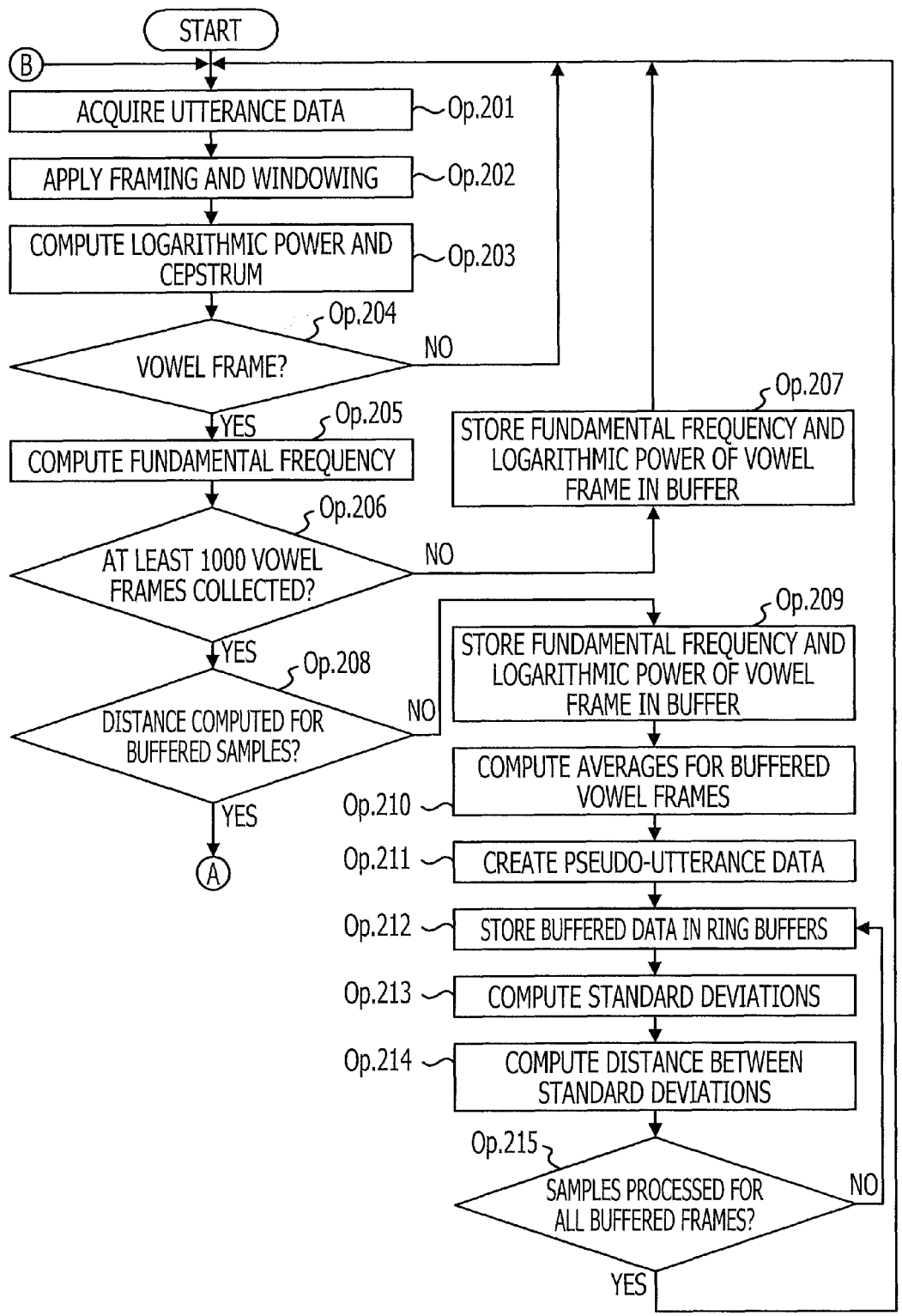
FIGS. 6A and 6B is a flowchart illustrating processing operations in a state detection process.
Figure 6B:
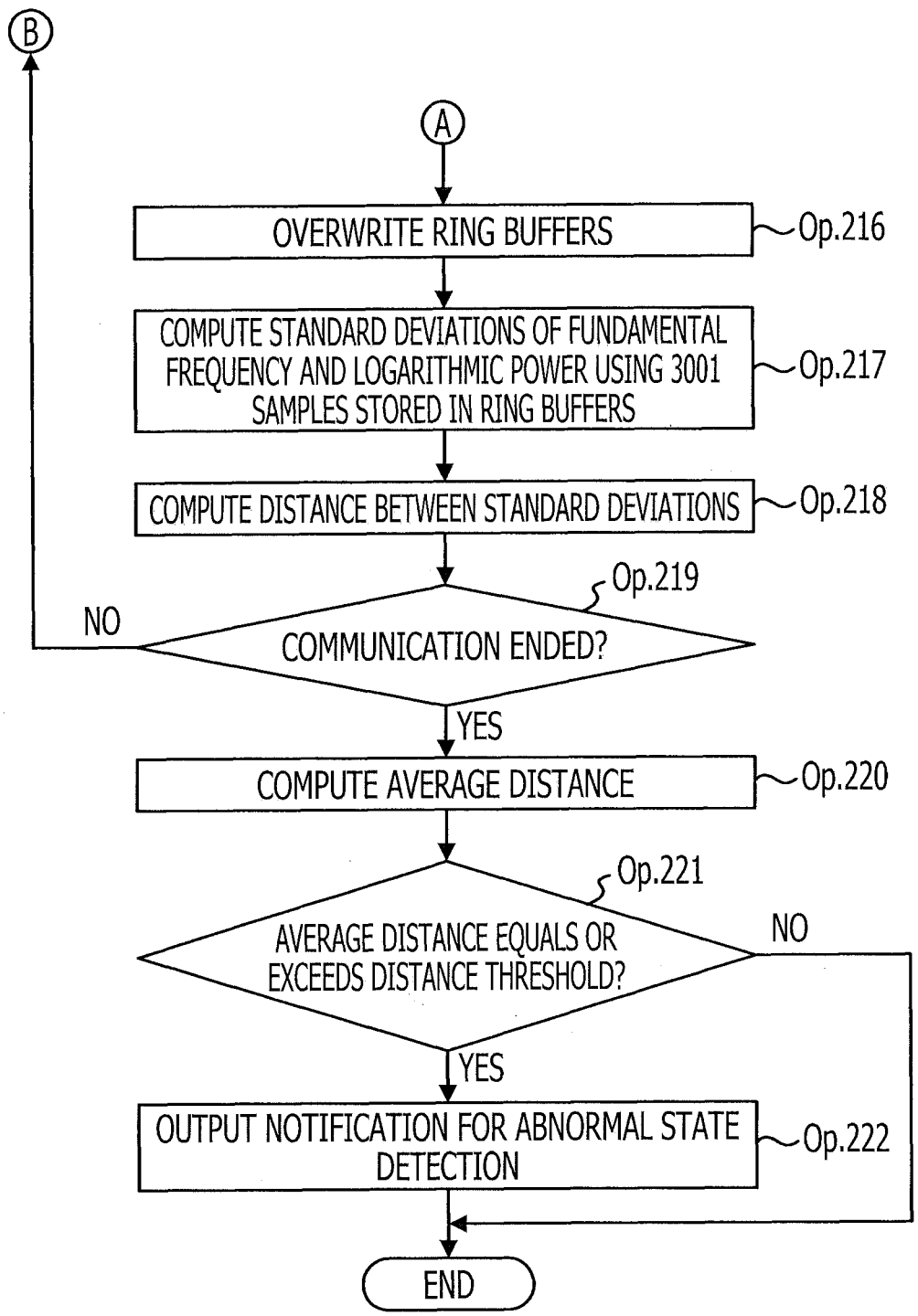

Next, FIG. 6 will be described. FIG. 6 is a flowchart of a state detection process. The state detection process detects when the speaker (i.e., the user of the communication apparatus 1) is in an abnormal state by analyzing data expressing the speaker's utterances.

Ops. 201 to 205 in FIG. 6 are similar to Ops. 101 to 105 in the reference utterance data statistical quantity registration process in FIG. 5.

In FIG. 6, first, in Op. 201, the acquirer 11 acquires utterance data sent from the AD converter 24 due to initiation of communication by the communication apparatus 1. Next, in Op. 202, the first computation unit 12 conducts framing and windowing of the utterance data.

Next, in Op. 203, the first computation unit 12 computes feature parameters which can be used to detect vowel frames from the signals of frames obtained in Op. 202. In this embodiment, the logarithmic power and cepstrum of signals included in frames are used as feature parameters.

Next, in Op. 204, the controller 18 determines, on the basis of the feature parameters computed in Op. 203, whether or not a frame acquired in Op. 202 is a vowel frame. At this point, the controller 18 proceeds to Op. 205 upon determining that the frame is a vowel frame. In contrast, the controller 18 returns to Op. 201 and causes the acquirer 11 to acquire subsequent utterance data upon determining that the frame is not a vowel frame.

Next, in Op. 205, the first computation unit 12 computes the fundamental frequency of a frame signal determined to be a vowel frame by the determination in Op. 204. Next, in Op. 206, the controller 18 determines whether or not the number of acquired vowel frames has reached 1000 or more. This number 1000 is a number of frames equivalent to 20 s in the case where the frame shift is set to 20 ms. The number of frames is preferably set to a length of time sufficient to stabilize the respective values of averages discussed later. In this embodiment, this number is taken to be 1000. Stabilization of the respective values of averages refers to value fluctuations being contained within a given range.

In the determination in Op. 206, the controller 18 proceeds to Op. 208 upon determining that the number of acquired vowel frames has reached 1000 or more. In contrast, the controller 18 proceeds to Op. 207 upon determining that the number of acquired vowel frames has not reached 1000.

In Op. 207, the controller 18 stores the fundamental frequency and logarithmic power of a vowel frame in a buffer 61. The controller 18 then returns to Op. 201 and causes the acquirer 11 to acquire subsequent utterance data. Herein, the fundamental frequency and logarithmic power are computed in Ops. 205 and 203. Also, the controller 18 itself is provided with the buffer 61, and is configured to use the RAM 52 in the case of realizing a state detecting apparatus 10 using the configuration in FIG. 4.

In Op. 208, the controller 18 determines whether or not a distance computation (Op. 214) has already been completed. At this point, the controller 18 proceeds to Op. 216 upon determining that the distance computation has already been completed. In contrast, the controller 18 proceeds to Op. 209 upon determining that the distance computation has not been completed. However, since distance is computed in Op. 214 later described, the distance computation has not been completed at the point when Op. 208 is executed following Op. 207.

In Op. 209, the controller 18 stores the fundamental frequency and logarithmic power of a vowel frame in the buffer 61.

Next, in Op. 210, the controller 18 reads out the fundamental frequencies and logarithmic powers of a plurality of vowel frames stored in the buffer 61. The controller 18 then computes an average fundamental frequency and an average logarithmic power for the plurality of vowel frames.

Next, in Op. 211, the pseudo-utterance data creator 13 creates pseudo-utterance data. The pseudo-utterance data creator 13 then stores the pseudo-utterance data in ring buffers 62. Herein, the controller 18 is provided with the ring buffers 62, and is configured to use the RAM 52 in the case of realizing a state detecting apparatus 10 using the configuration in FIG. 4. Also, two ring buffers 62 are prepared herein, with one being used to store fundamental frequency, and one being used to store logarithmic power.

Pseudo-utterance data related to fundamental frequency is created on the basis of the average fundamental frequency of utterance data and the standard deviation of the fundamental frequency of reference utterance data. Also, pseudo-utterance data related to logarithmic power is created on the basis of the average logarithmic power of utterance data and the standard deviation of the logarithmic power of reference utterance data. Meanwhile, reference utterance data is saved in the reference utterance data storage 17. Specifically, if the average fundamental frequency (or average logarithmic power) of utterance data is taken to be $\mu$, and the standard deviation of fundamental frequency (or standard deviation of the logarithmic power) of reference utterance data is taken to be $\sigma$, then the following sequence is created and taken to be the fundamental frequency or logarithmic power of pseudo-utterance data: $\mu+\sigma, \mu-\sigma, \mu+\sigma, \mu-\sigma, \mu+\sigma, \mu-\sigma$, and so on.

Pseudo-utterance data thus matches the utterance data by having an average of $\mu$, and also matches the reference utterance data by having a standard deviation of $\sigma$. The pseudo-utterance data creator 13 creates such pseudo-utterance data for the fundamental frequency and logarithmic power, respectively.

Also, the pseudo-utterance data creator 13 creates a number of samples of pseudo-utterance data equal to one less than the buffer size of the ring buffers 62. For example, in the case where the buffer size of the ring buffers 62 is equivalent to 3001 samples, the pseudo-utterance data creator 13 creates 3000 samples each of pseudo-utterance data according to the above sequence for the fundamental frequency and logarithmic power, respectively. The pseudo-utterance data creator 13 sequentially stores the fundamental frequencies and logarithmic powers of the created pseudo-utterance data in their respective ring buffers 62.

Next, in Op. 212, the controller 18 reads out the fundamental frequencies and logarithmic powers of vowel frames stored in the buffer 61 in Op. 209 or 207 one at a time, and respectively stores them in the two ring buffers 62. In the case where Op. 212 is conducted for the first time after Op. 211, the controller 18 takes the least recently acquired fundamental frequency and logarithmic power being stored in the buffer 61, and respectively stores them in the 3001st storage positions in the two ring buffers 62.

Next, in Op. 213, the second computation unit 14 references the two ring buffers 62 and computes the respective standard deviations of fundamental frequency and logarithmic power. Herein, take $\sigma_{pitch}(k)$ to be the standard deviation of the fundamental frequency and $\sigma_{power}(k)$ to be the standard deviation of the logarithmic power computed in Op. 213, where k is the number of fundamental frequencies and logarithmic powers of vowel frames which were read out from the buffer 61 and stored in the ring buffers 62.

Next, in Op. 214, the detector 15 computes the distance between the respective standard deviations of fundamental frequency and logarithmic power computed in Op. 213, and standard deviations stored for reference utterance data.

Take $\sigma_{ref\_pitch}$ and $\sigma_{ref\_power}$ to be the respective standard deviations of the fundamental frequency and logarithmic power of reference utterance data which was stored in the reference utterance data storage 17 by the reference utterance data statistical quantity registration process. At this point, the detector 15 computes the above distance dist(k) according to the following Eq. 4.

$$dist(k) = \sqrt{\{\sigma_{ref\_pitch} - \sigma_{pitch}(k)\}^2 + \{\sigma_{ref\_power} - \sigma_{power}(k)\}^2} \quad \text{Eq. 4}$$

In other words, this distance expresses the distance between synthetic utterance data and reference utterance data in a two-dimensional space defined by the standard deviation of the fundamental frequency of utterances over time and the standard deviation of the logarithmic power of utterances over time.

Herein, the distance computed in Op. 214 is saved in memory provided in the detector 15 itself. This memory is configured using the RAM 52 in the case of realizing a state detecting apparatus 10 using the configuration in FIG. 4.

Next, in Op. 215, the controller 18 determines whether or not all fundamental frequencies and logarithmic powers have been stored in the ring buffers 62 for the vowel frames stored in the buffer 61. At this point, the controller 18 returns to Op. 201 and causes the acquirer 11 to acquire subsequent utterance data upon determining that all fundamental frequencies and logarithmic powers which were being stored in the buffer 61 are now stored in the ring buffers 62. In contrast, the controller 18 returns to Op. 212 upon determining that a fundamental frequency and a logarithmic power not yet stored in the ring buffers 62 remain in the buffer 61. At this point, in Op. 212, the oldest of the samples not yet stored in the ring buffers 62 is read out from the buffer 61, and that sample is stored in the next position following the position where the last sample was stored in the ring buffers 62.

In this way, data regarding vowel frames included in utterance data is stored in ring buffers 62 to form continuous pseudo-utterance data. Such data stored in the ring buffers 62 is synthetic utterance data.

When Ops. 201 to 208 are conducted after Op. 215, the determination result becomes Yes in both Ops. 206 and 208, and the process proceeds to Op. 216. In Op. 216, the controller 18 stores the fundamental frequency and logarithmic power of a newly acquired vowel frame in the next position following the position where a sample for the previous vowel frame was stored in the ring buffers 62.

Next, in Op. 217, the second computation unit 14 computes the respective standard deviations of the fundamental frequency and logarithmic power. This processing operation is similar to Op. 213 discussed above.

Next, in Op. 218, the detector 15 computes the distance between the standard deviation of the fundamental frequency computed in Op. 217 and the standard deviation of the fundamental frequency of reference utterance data. The detector 15 also computes the distance between the standard deviation of the logarithmic power computed in Op. 217 and the standard deviation of the logarithmic power of reference utterance data. This processing operation is similar to Op. 214 discussed above. These distances computed in Op. 218 are likewise saved in memory provided in the detector 15 itself.

Next, in Op. 219, the controller 18 determines whether or not communication by the communication apparatus 1 has ended. At this point, the controller 18 proceeds to Op. 220 upon determining that communication has ended. In contrast, the controller 18 returns to Op. 201 and causes the acquirer 11 to acquire subsequent utterance data upon determining that communication has not yet ended. Meanwhile, in the case where Ops. 201 to 208 are conducted after Op. 219, the determination result becomes Yes in both Ops. 206 and 208, and Ops. 216 to 218 are conducted.

In Op. 220, the detector 15 computes the average distance from a number of distances computed in Op. 214 and 218 which are equal to the number of vowel frames obtained by the processing sequence. A technique for computing this average distance will be described later.

Next, in Op. 221, the detector 15 compares the magnitude of the average distance computed in Op. 220 to a given distance threshold to determine whether or not the average distance equals or exceeds the distance threshold. At this point, in the case where the average distance equals or exceeds the distance threshold, the detector 15 considers the user of the communication apparatus 1 to be in an abnormal state and proceeds to Op. 222. Next, in Op. 222, the controller 18 issues a given instruction to the output unit 40 of the communication apparatus 1 to output a given notification indicating that the user of the communication apparatus 1 is in an abnormal state. The state detecting apparatus 10 then ends the state detection process. In contrast, in the case where the average distance is less than the distance threshold, the detector 15 considers the user of the communication apparatus 1 to be in a non-abnormal state, and ends the state detection process.

Figure 7:
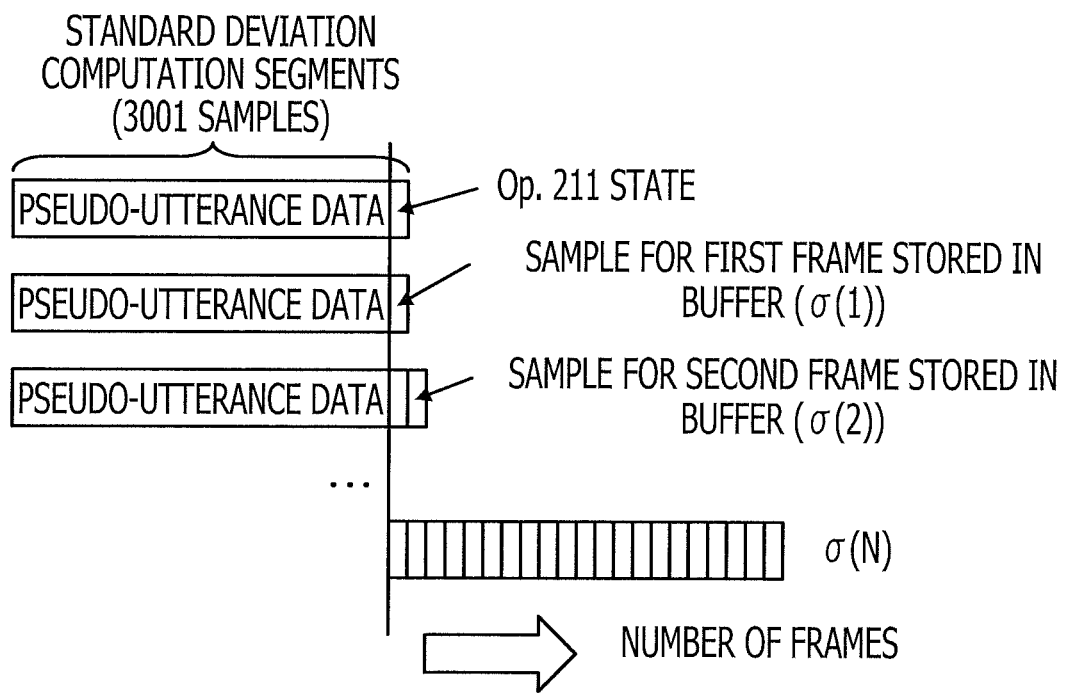
FIG. 7 is a schematic diagram illustrating shifts of pseudo-utterance data in a ring buffer.

The foregoing processing operations constitute a state detection process. Next, the principle behind detecting that the user of a communication apparatus 1 is in an abnormal state in such a state detection process will be described. First, FIG. 7 will be described. FIG. 7 is a schematic diagram illustrating shifts of synthetic utterance data in a ring buffer 62.

In FIG. 7, the Op. 211 state represents the state in which 3000 samples of pseudo-utterance data are being stored in a ring buffer 62, which has a buffer size that can store 3001 samples.

Also, the state on the second row in FIG. 7 represents the state for the case where Op. 212 in FIG. 6 is first executed, in which the oldest sample being stored in the buffer 61 is stored in the 3001st storage position of the ring buffers 62. In the subsequent Op. 213, the standard deviations σ(1) are computed for the 3001 samples being stored in the ring buffers 62, or in other words, for 3000 samples of pseudo-utterance data and one sample of utterance data.

Also, the state on the third row in FIG. 7 represents the state in which the second-oldest sample being stored in the buffer 61 is written over the sample of pseudo-utterance data at the storage position in the ring buffers 62 indicated by the state on the second row, as a result of Op. 212 being executed for a second time. In the subsequent Op. 213, the standard deviations σ(2) are computed for the 3001 samples being stored in the ring buffers 62, or in other words, for 2999 samples of pseudo-utterance data and two samples of utterance data.

By repeating Ops. 212 and 213 in accordance with the determination result from Op. 215, the ratio of pseudo-utterance data gradually decreases while the ratio of utterance data gradually increases for the samples being stored in the ring buffers 62. Then, when 3001 samples of utterance data are obtained, the samples being stored in the ring buffers 62 are all utterance data samples.

Figure 8:
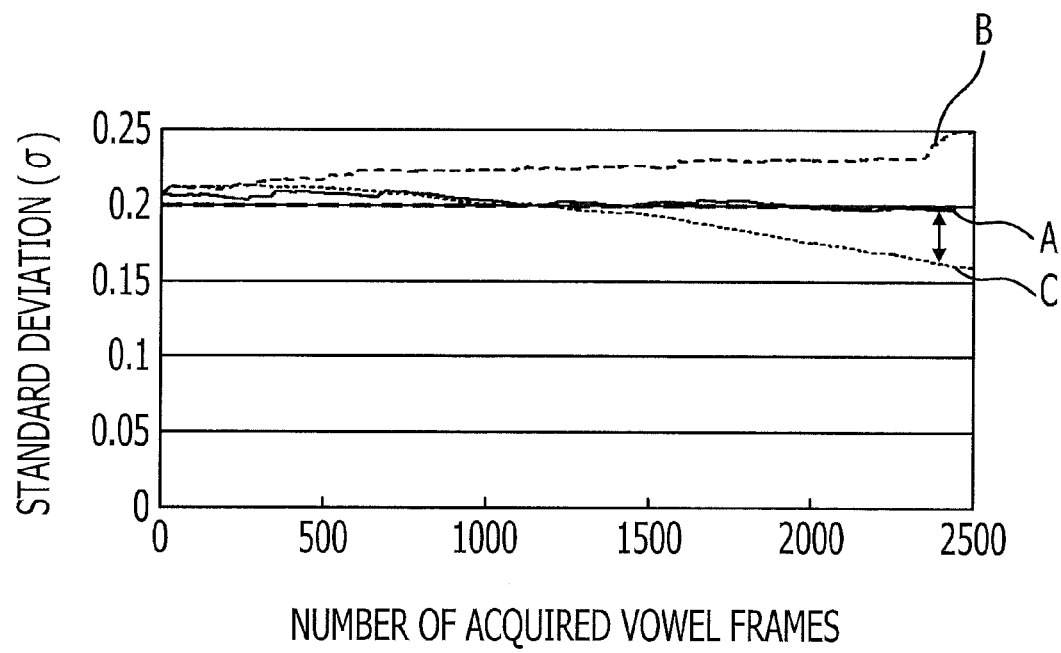
FIG. 8 is a graph illustrating relationships between numbers of vowel frames and the standard deviation of samples in a ring buffer.

FIG. 8 is a graph plotting the relationship between values of standard deviations computed in this way and numbers of vowel frames included in utterance data used for such computation. Herein, the standard deviations indicated by a broken line in FIG. 8 are the standard deviations of pseudo-utterance data, and as discussed earlier, their values are the same as those of the standard deviations of reference utterance data.

In FIG. 8, the plot A represents the case where the statistical properties of feature parameters of utterance data resembles the statistical properties of feature parameters of pseudo-utterance data, or in other words, a non-abnormal state. Herein, statistical properties refer to indicators of fluctuation in a distribution. The standard deviations σ are representative examples of such statistical properties. In this case, the standard deviations σ merely rise or fall with the reference values and do not widely separate therefrom, even if there is an increase in the ratio of vowel frame samples versus pseudo-utterance data samples stored in the ring buffers 62.

In contrast, the plots B and C in FIG. 8 represent cases where the statistical properties of feature parameters of utterance data significantly differ from the statistical properties of feature parameters pseudo-utterance data, or in other words, an abnormal state. In these cases, the standard deviations σ gradually diverge from the reference values as the ratio of utterance data samples versus pseudo-utterance data samples increases among the samples being stored in the ring buffers 62.

Herein, the plot B is an exemplary case where the standard deviations σ increase, while the plot C is an exemplary case where the standard deviations σ decrease. Furthermore, in these plots, divergence of the standard deviations σ from the reference values becomes gentler starting from the 3001st frame, at which point all samples being stored in the ring buffers 62 become vowel frame samples.

Figure 9:
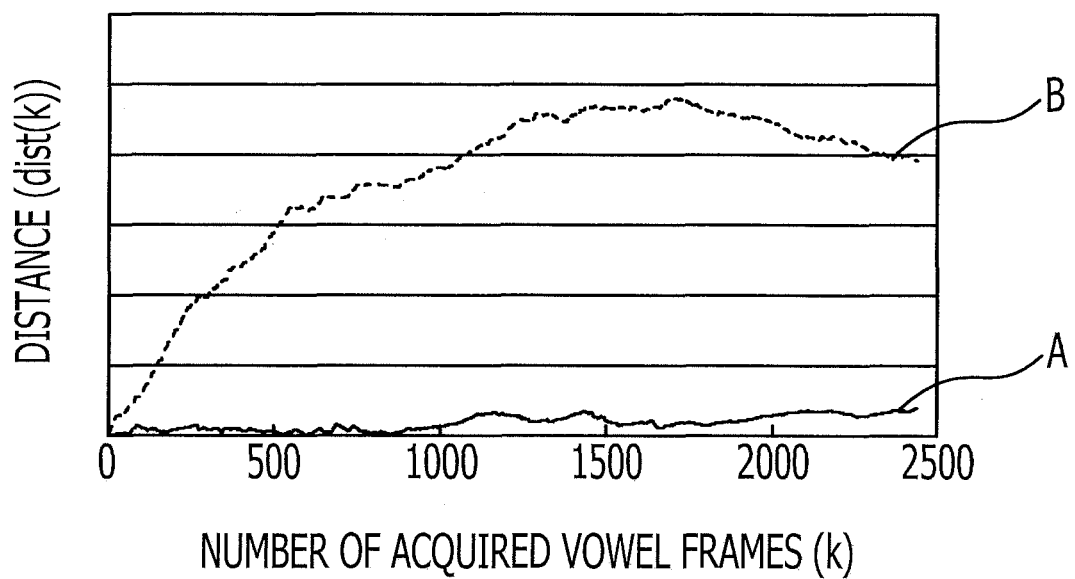
FIG. 9 is a graph illustrating relationships numbers of vowel frames and distances.

In the case where the distance between the standard deviations of reference utterance data and the standard deviations computed from samples stored in the ring buffers 62 is defined as in Eq. 4 presented earlier, change in this distance dist(k) becomes like that in FIG. 9.

In FIG. 9, the plot A represents the case where the statistical properties of feature parameters of utterance data resemble those of pseudo-utterance data. In this case, the distance is short since the difference between the two types of standard deviations is small, and in addition, the distance does not greatly increase even when the number of vowel frames increases.

In contrast, the plot B in FIG. 9 represents the case where the statistical properties of utterance data significantly differ from those of pseudo-utterance data. In this case, the distance increases as the number of vowel frames increases. However, increase in the distance becomes gentler starting from the 3001st frame, at which point all samples being stored in the ring buffers 62 become vowel frame samples.

In this embodiment, the average of pseudo-utterance data samples is made to match the average utterance data, as discussed earlier. This is done to minimize differences in the sample averages between pseudo-utterance data and utterance data, and mitigate the effects such differences exert on the values of the standard deviations for samples stored in the ring buffers 62.

Next, a technique for the average distance computation conducted in Op. 220 of the state detection process in FIG. 6 will be described using FIGS. 10A and 10B. There is a change in the behavior of the distance between the two types of standard deviations over time when the number of vowel frames changes from less than 3001 frames to 3001 frames and more. Thus, the method of computing the average distance is switched between a case where the number of vowel frames obtained before communication ends is less than 3001 frames, and a case where the number of vowel frames is 3001 frames or more.

Figure 10A:
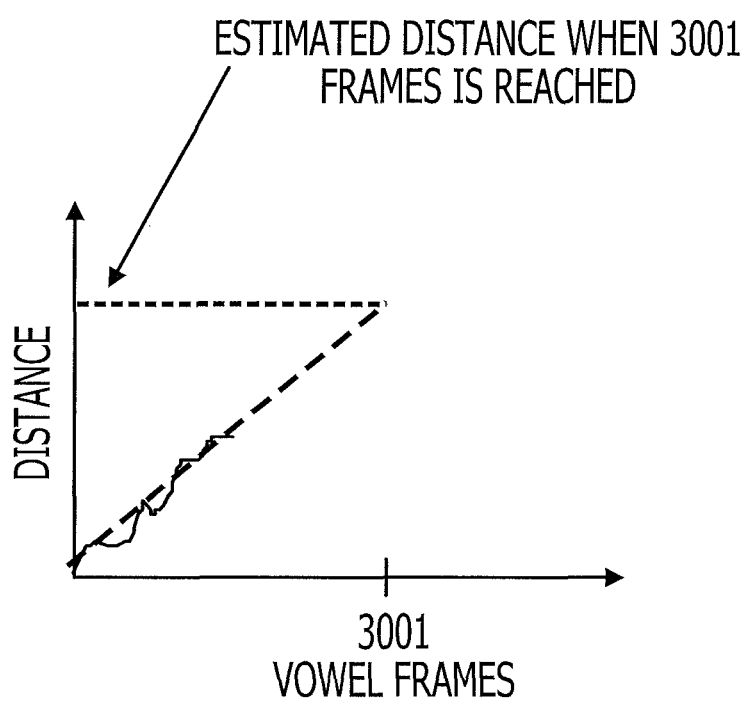
FIG. 10A is a diagram explaining an average distance computation technique (1 of 2)

FIG. 10A illustrates a technique for computing the average distance in the case where the number of vowel frames obtained before communication ends is less than 3001 frames. In this case, the relationship between the number of vowel frames and the distance values obtained according to the number of vowel frames can be approximated by a first-order function, and the average distance is taken to be the estimated distance value for the case where the number of vowel frames is 3001 frames.

Figure 10B:
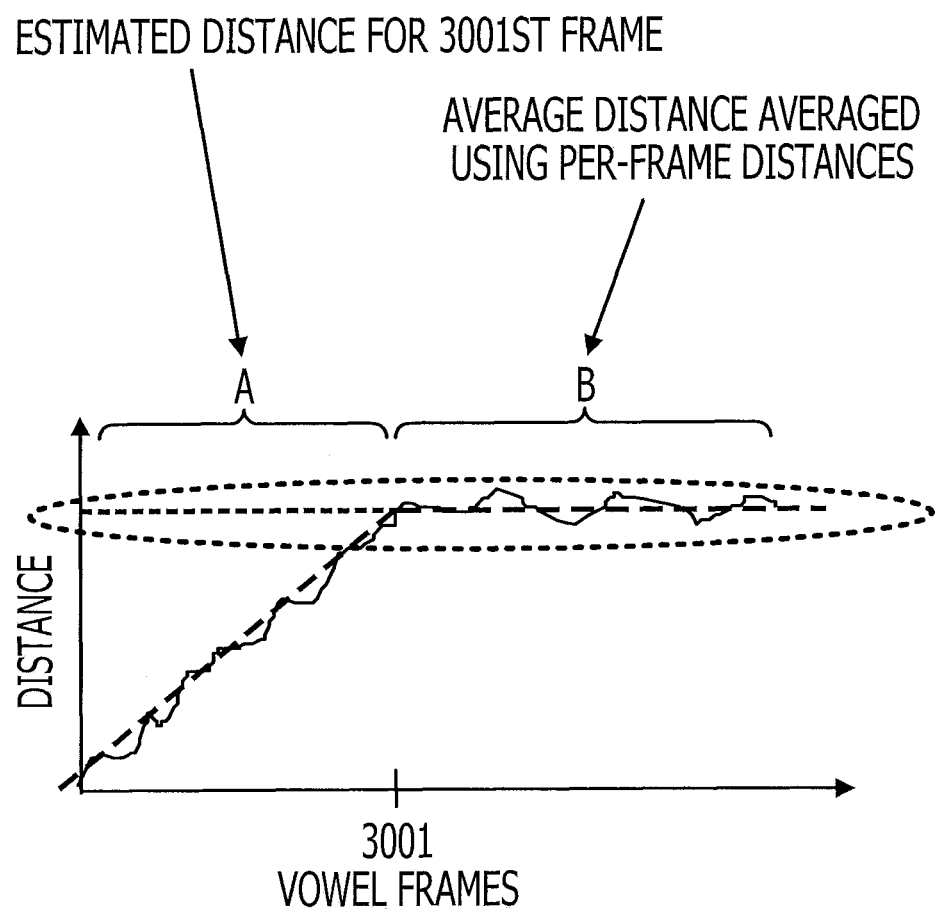
FIG. 10B is a diagram explaining an average distance computation technique (2 of 2)

FIG. 10B illustrates a technique for computing the average distance in the case where the number of vowel frames obtained before communication ends is 3001 frames or more. In this case, the distances for the first to the 3000th vowel frames are all taken to be the average distance computed as in FIG. 10A. Meanwhile, the actual distances computed in Op. 218 in FIG. 6 are used for the distances for the 3001st and subsequent vowel frames. The average distance is computed on the basis of these distances. Consequently, the average distance is computed by summing the average distance for the case of FIG. 10A, multiplied by a factor of 3000, to the individual distances for the 3001st and subsequent vowel frames, and dividing this sum by the number of vowel frames obtained before communication ends.

In Op. 221 in FIG. 7, the detector 15 compares the magnitude of the average distance computed as above to a given distance threshold to determine whether or not the average distance equals or exceeds the distance threshold. In this way, it is detected if the speaker (i.e., the user of the communication apparatus 1) is in an abnormal state.

As above, a state detecting apparatus 10 in this embodiment is able to compute standard deviations using a large amount of sample data from reference utterance data expressing utterances made in a normal state, and thus stable statistical quantities can be used as a reference. Also, by adding pseudo-utterance data having the statistical properties of the reference utterance data to utterance data when computing statistical quantities, an abnormal state can be reliably detected even with a small number of utterance data samples.

Figure 11:
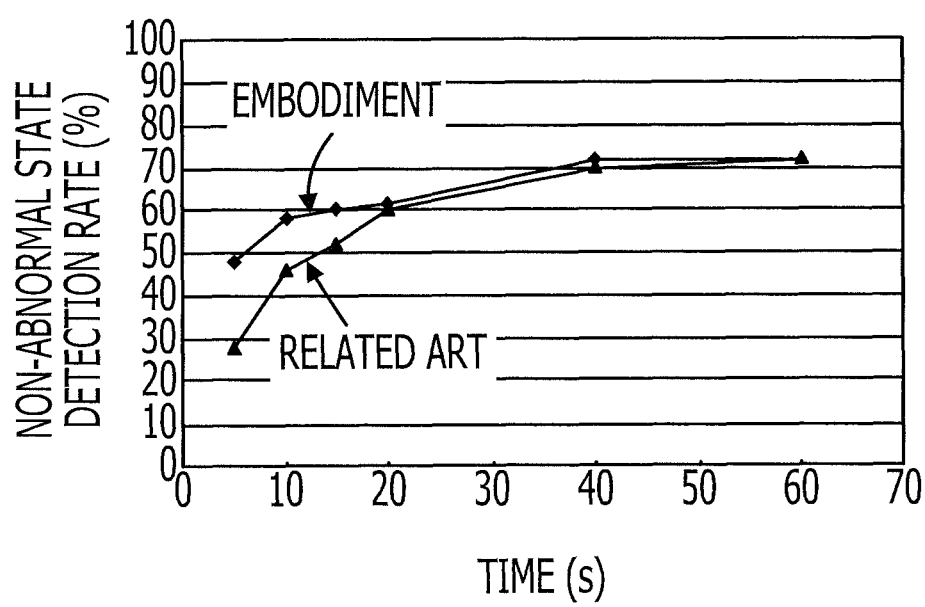
FIG. 11 is a graph illustrating a comparison of an abnormal state detection technique by a state detecting apparatus and a technique of the related art.

FIG. 11 is a graph illustrating the results of a comparison between an abnormal state detection technique by a state detecting apparatus 10 in this embodiment, and a technique of the related art that simply calculates statistical quantities using just the speech data that has been input to compute the distance from a normal model.

The graph in FIG. 11 plots non-abnormal state detection rates for the case of correctly detecting a conversation with a friend as a non-abnormal state and detecting a conversation simulating a soliciting call or a threatening call as an abnormal state for 50 speakers. In the graph in FIG. 11, the horizontal axis represents the number of vowel frames converted into a number of seconds, while the vertical axis represents the non-abnormal state detection rate. Consequently, if the non-abnormal state detection rate is low, an ordinary conversation that is not an abnormal state may be mistakenly detected as an abnormal state. Herein, the determination threshold for detection has been experimentally adjusted such that the state detection rates become approximately the same for the technique of the related art and the technique of this embodiment.

As this graph demonstrates, as the number of input vowel frames decreases, the detection rate for a non-abnormal state lower with the technique of the related art, whereas worsening of the detection rate for a non-abnormal state is suppressed with the detection technique of this embodiment. The reason for this is as follows.

In the field of statistics, it has been established that if a sample distribution is computed with few samples, its error with respect to the population distribution increases. In the technique of the related art, a sample distribution is computed with few samples, and thus there are large fluctuations with respect to the population distribution. Since standard deviation fluctuations cause an increase in the distance to the reference values, with few samples the distance with respect to the population distribution increases more readily, even for a non-abnormal state, and the normal detection rate worsens. In contrast, with the detection technique in this embodiment, even when there are few samples, the remaining samples are compensated for by samples from the population distribution, and thus the error with respect to the population distribution is small. Consequently, since fluctuation of the sample distribution versus the population distribution for each trial is small, the effects of having few samples are minimized.

Recently a type of fraud referred to as phone phishing, in which a victim is deceived over telephone and made to transfer money, is becoming a serious social problem in some countries. A conventional tactic in such fraud is for the fraudster to overwhelm the victim's judgment with vast amounts of information. Consequently, if it can be detected from the victim's utterances during a telephone call with a fraudster that the victim has fallen into an abnormal state, then by informing the victim of the detection result, it may be possible to preemptively mitigate losses from phone phishing. With phone phishing, there is an increased ratio of the victim listening to the other party, while making few utterances him- or herself. For this reason, it may be difficult to obtain a sufficient number of speech samples from the victim's utterances. As a result, sufficient detection accuracy may not be obtained with abnormal state detection using emotion analysis of the related art. However, according to the technology disclosed in this embodiment, a speaker's state can be detected even with a small number of speech samples.

In this embodiment, although fundamental frequency and logarithmic power are used as feature parameters of utterance data used to detect if a speaker is in an abnormal state in this embodiment, a variety of feature parameters utilized in speech signal processing may also be used instead. Examples of usable feature parameters include the zero-crossing rate, the variation of high-frequency components in the residual power spectrum, the bandlimited logarithmic power, the spectral slope, mel-frequency cepstral coefficients (MFCCs), and linear predictive coding cepstrum (LPCC). Delta parameters of the above may also be used.

Also, in this embodiment, although distance is computed in a two-dimensional space related to two feature parameters, i.e., the fundamental frequency and the logarithmic power, it is easily conceivable to expand this space to three or more feature parameters. In such cases, Eq. 4 presented earlier may be rewritten to compute distance by adding together a number of sum-of-squares terms under the square root equal to the number of different feature parameters.

Also, in this embodiment, it is configured such that a distance dist(k) is computed for all vowel frames obtained from acquired utterance data. However, utterance data may include utterance data whose feature parameters exhibit significant temporal change in their statistical quantities, such as sneezing, coughing, or laughing, for example. It is conceivable that such data may be determined be vowel frames. Thus, it may be configured such that vowel frames not included in actual vowel utterances are not stored in the ring buffers 62 and are not used to calculate standard deviations. In so doing, it becomes possible to reliably compute an average distance, even if there is sudden variation in the fundamental frequency or power caused by the above-described.

Figure 12:
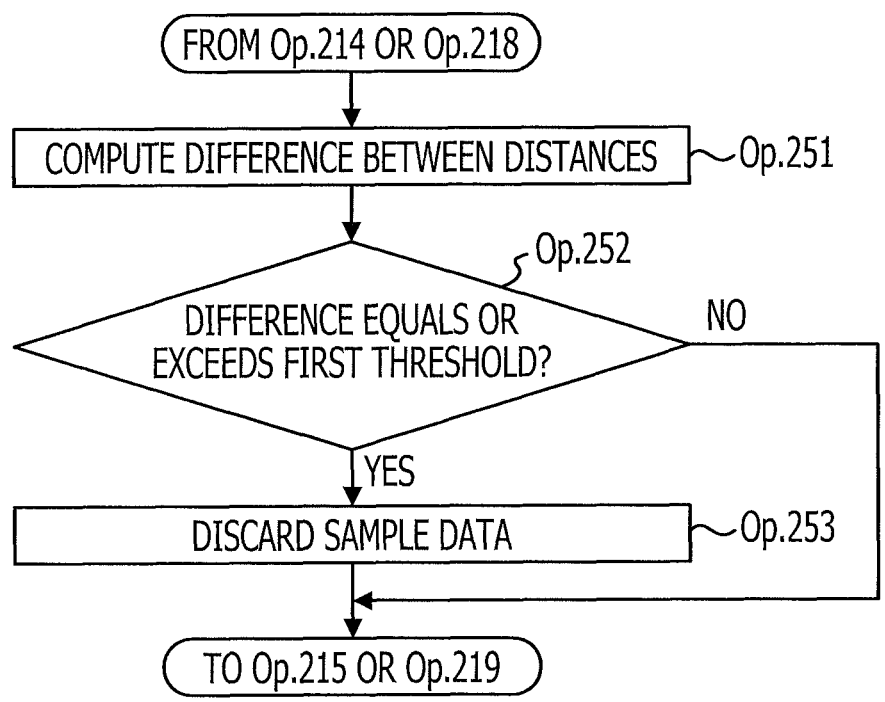
FIG. 12 is a flowchart illustrating partial processing operations in a modification of a state detection.

FIG. 12 will now be described. FIG. 12 is a flowchart illustrating partial processing operations in a modification of the state detection process in FIG. 6. This process causes the state detecting apparatus 10 to not use vowel frames not included in actual vowel utterances in order to calculate standard deviations.

The flowchart in FIG. 12 is inserted between Ops. 214 and 215 and between Ops. 218 and 219 in FIG. 6. In FIG. 12, Op. 251 is executed after Op. 214 or 218 in FIG. 6. In Op. 251, the detector 15 computes the difference between a distance computed in Op. 214 or 218, and the next most recently computed distance.

Next, in Op. 252, the detector 15 determines whether or not the computed difference value equals or exceeds a preset first threshold. At this point, the detector 15 proceeds to Op. 253 upon determining that the difference value equals or exceeds the first threshold.

In Op. 253, the determination result from Op. 252 is issued to the controller 18, and the sample data for the most recently stored vowel frame is discarded from the ring buffers 62. In other words, the detector 15 returns the ring buffers 62 to the state before the sample data for the most recently stored vowel frame was stored therein.

Subsequently, when Op. 253 ends or when the detector 15 determines in Op. 252 that the difference value computed in Op. 251 is less than the first threshold, the process proceeds to Op. 215 or 219 in FIG. 6.

By conducting the above process, sample data for vowel frames that do not contain vowels normally uttered in practice is removed from standard deviation calculations. Thus, it is possible to mitigate aberrations in estimated standard deviations which may occur due to including sounds with sudden and significant temporal change, such as sneezing, coughing, and laughing, in the calculation of standard deviations.

In this embodiment, high detection accuracy can be expected in the case where the speaker of utterances expressed by reference utterance data is identical to the speaker for whom an abnormal state is to be detected. However, by updating reference utterance data according to the embodiment described hereinafter, the detection accuracy for detecting an abnormal state can be improved, even if the speaker of utterances expressed by reference utterance data is unspecified.

In this embodiment, default values for reference utterance data are first acquired. For this reason, the reference utterance data statistical quantity registration process is performed on utterances from many speakers. Then, the first computation unit 12 is made to compute averages for the statistical quantities of feature parameters for each speaker's utterances which are computed in Ops. 111 and 112. In other words, average standard deviations for the fundamental frequency and the logarithmic power are computed. Then, in Op. 113, it is configured such that the controller 18 causes the standard utterance data storage 17 of the communication apparatus 1 to store and save these averages as statistical quantities of feature parameters for reference utterance data given by unspecified speakers. The work of storing such statistical quantities of feature parameters for reference utterance data given by unspecified speakers may also be completed before shipping out the communication apparatus 1 from the manufacturer.

Figure 13:
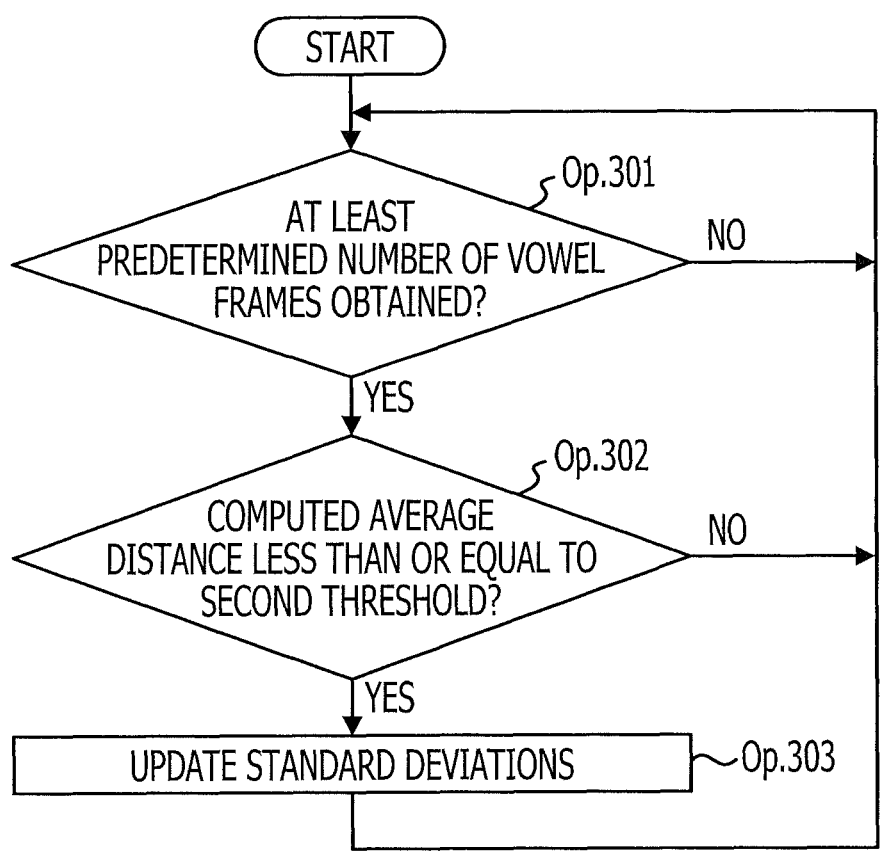
FIG. 13 is a flowchart illustrating processing operations in a reference utterance data update process.

FIG. 13 will now be described. FIG. 13 is a flowchart illustrating processing operations in a reference utterance data update process. This process updates the statistical quantities of feature parameters (i.e., the standard deviations of the fundamental frequency and the logarithmic power) for reference utterance data.

This reference utterance data update process is executed in parallel with the state detection process in FIG. 6. In Op. 301 of FIG. 13, the updater 16 first determines whether or not the number of acquired vowel frames obtained from utterance data by the state detection process equals or exceeds a given number. At this point, the updater 16 proceeds to Op. 302 upon determining that the number of acquired vowel frames equals or exceeds the given number. In contrast, upon determining that the number of acquired vowel frames is less than the given number, the updater 16 repeats the determination until the number of acquired vowel frames becomes equal to or greater than the given number.

Next, in Op. 302, the updater 16 determines whether or not the most recently computed average distance from Op. 220 of the state detection process is less than or equal to a preset second threshold. At this point, the updater 16 proceeds to Op. 303 upon determining that the average distance is less than or equal to the second threshold. In contrast, the updater 16 returns to Op. 301 and repeats the above determinations upon determining that the average distance is greater than the second threshold.

Next, in Op. 303, the updater 16 updates the standard deviations of the fundamental frequency and the logarithmic power for reference utterance data saved in the standard utterance data storage 17 of the communication apparatus 1. In this update operation, the following Eq. 5 is evaluated and respectively computed standard deviations $\sigma_{new}$ are stored in the standard utterance data storage 17.

$$\sigma_{new} = \alpha \cdot \sigma_{org} + (1.0 - \alpha) \cdot \sigma_{input} \qquad \text{Eq. 5}$$

In Eq. 5, $\sigma_{org}$ is the standard deviation of the fundamental frequency or the logarithmic power for reference utterance data currently saved in the standard utterance data storage 17, while $\sigma_{input}$ is the standard deviation of the fundamental frequency or the logarithmic power currently being stored in one of the ring buffers 62. For example, $\sigma_{input}$ may be a value computed in Op. 217 of the state detection process. Preferably, the values used for $\sigma_{input}$ are standard deviations calculated after all fundamental frequencies and logarithmic powers stored in the ring buffers 62 have been replaced with utterance data. In other words, a state wherein the ring buffers 62 are minimally occupied by pseudo-utterance data is preferable. Also, although vowel frames are individually updated in this case, it may also be configured such that Ops. 106 and 107 in FIG. 5 are conducted until communication ends and the values to be used for $\sigma_{input}$ are calculated after communication has ended.

Also, the value of $\alpha$ in Eq. 5 is made to monotonically increase according to the number of times that Op. 303 has been executed, such that the incremental update magnitude monotonically decreases with repeated updates. In this embodiment, the value of $\alpha$ is taken to be 0.5 when Op. 303 is executed for the first time, 0.9 when executed for the second time, 0.99 when executed for the third to ninth times, and 0.999 when executed for the tenth and subsequent times.

When the above Op. 303 ends, the process returns to Op. 301 and repeats the above determinations. The foregoing processing operations constitute a reference utterance data update process, whereby statistical quantities of feature parameters for reference utterance data are updated using acquired utterance data.

Meanwhile, in the case where statistical quantities of feature parameters for reference utterance data have been updated by the reference utterance data update process, processing operations based on the updated statistical quantities of feature parameters for reference utterance data are conducted in the subsequently executed state detection process. Consequently, the pseudo-utterance data creator 13 creates pseudo-utterance data based on updated statistical quantities of feature parameters for reference utterance data. Also, the second computation unit 14 computes statistical quantities of feature parameters for synthetic utterance data on the basis of statistical quantities of feature parameters for pseudo-utterance data based on the updated statistical quantities of feature parameters for reference utterance data, and for utterance data acquired by the acquirer 11. Additionally, the detector 15 conducts the detection discussed earlier on the basis of differences between statistical quantities of feature parameters for synthetic utterance data, which have been computed on the basis of updated statistical quantities of feature parameters for reference utterance data, and the updated statistical quantities of feature parameters for reference utterance data.

It may also be configured such that statistical quantities of feature parameters for reference utterance data are only updated by utterance data from conversations with contacts included in the contacts list data stored in the contacts list data storage 20 of the communication apparatus 1. Since it can be assumed that a speaker engaged in such conversations would be in a non-abnormal state, it can be expected that the statistical quantities of feature parameters for reference utterance data will be updated to suitable values.

Figure 14:
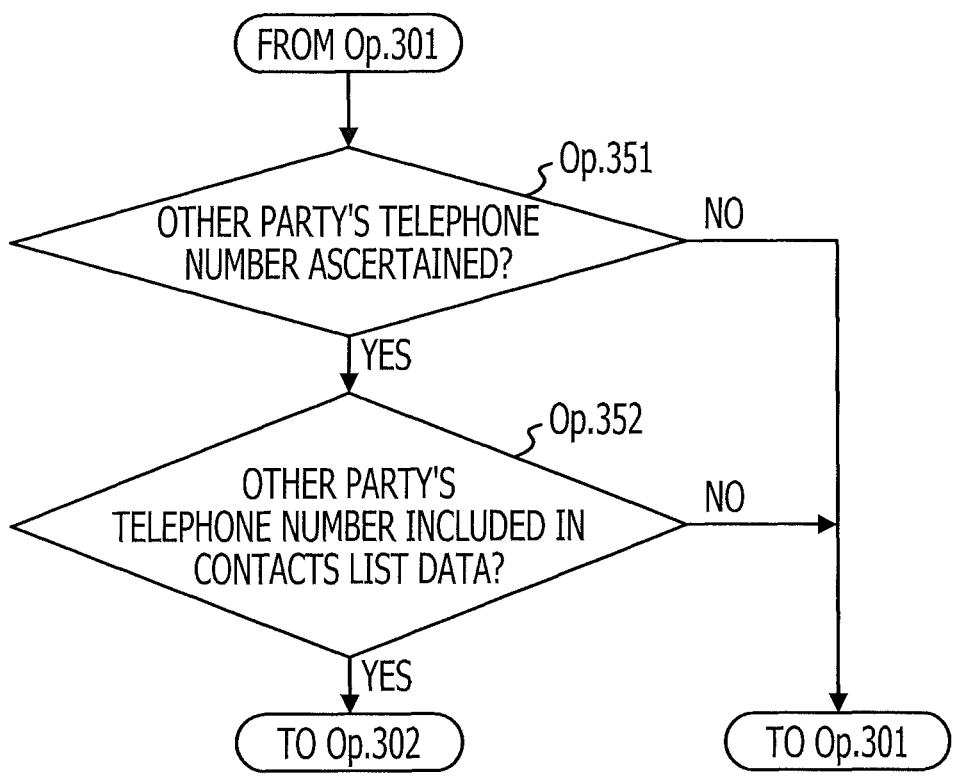
FIG. 14 is a flowchart illustrating partial processing operations in a first modification of a reference utterance data update process.

FIG. 14 will now be described. FIG. 14 is a flowchart illustrating partial processing operations in a first modification of the reference utterance data update process in FIG. 13. This process causes the state detecting apparatus 10 to update statistical quantities of feature parameters for reference utterance data with only utterance data from conversations with contacts included in a contacts list.

The flowchart in FIG. 14 is inserted between Ops. 301 and 302 in FIG. 13. In FIG. 14, Op. 351 is executed in the case where the determination result is Yes in Op. 301 of FIG. 13. In Op. 351, the updater 16 determines whether or not the other party's telephone number has been ascertained.

For example, in the case of communication initiated by the communication apparatus 1 placing a call, the communication apparatus 1 itself recognizes the other party's telephone number. Meanwhile, in the case of communication initiated by receiving a call from another party, the other party's telephone number can be ascertained if telephone number information is issued from the other party.

In the determination in Op. 351, the updater 16 proceeds to Op. 352 upon determining that the other party's telephone number has been ascertained. In contrast, the updater 16 returns to Op. 301 in FIG. 13 and repeats the determination discussed earlier upon determining that the other party's telephone number has not been ascertained.

Next, in Op. 352, the updater 16 references contacts list data stored in the contacts list data storage 20 of the communication apparatus 1 and determines whether or not the ascertained telephone number of the other party is included in the contacts list data. At this point, the updater 16 proceeds to Op. 302 in FIG. 13 and conducts the determination discussed earlier upon determining that the other party's telephone number is included in the contacts list data. In contrast, the updater 16 returns to Op. 301 in FIG. 13 and repeats the determination discussed earlier upon determining that the other party's telephone number is not included in the contacts list data.

By conducting the above process, statistical quantities of feature parameters for reference utterance data are only updated by utterance data from conversations with contacts included in contacts list data.

Furthermore, it may also be configured such that statistical quantities of feature parameters for reference utterance data are updated only in the case of conversations with friends or relatives from among the contacts included in contacts list data. For example, it may be determined whether or not a conversation is a conversation with a friend or relative based on whether or not a "friend or relative" attribute is present in the contacts list data.

Also, regarding the acquisition of default values in the reference utterance data update process discussed earlier, only one set of standard deviations for the fundamental frequency and logarithmic power are saved in the standard utterance data storage 17 as statistical quantities of feature parameters for reference utterance data given by unspecified speakers. Instead, however, it may be configured such that plural sets of default values for the statistical quantities of feature parameters for reference utterance data are saved in the standard utterance data storage 17. In this case, plural sets of default values for statistical quantities of feature parameters for reference utterance data prepared in this way may be stored as values computed for a large number of male speakers and a large number of female speakers, for example.

In the state detection process in FIG. 6, it may be configured such that plural sets of statistical quantities for feature parameters are individually used to compute the above-discussed distance dist(k) and average distance for each set. Additionally, it may be configured such that Op. 391 illustrated in FIG. 15 is inserted and executed between Ops. 302 and 303 in the reference utterance data update process in FIG. 13.

Figure 15:
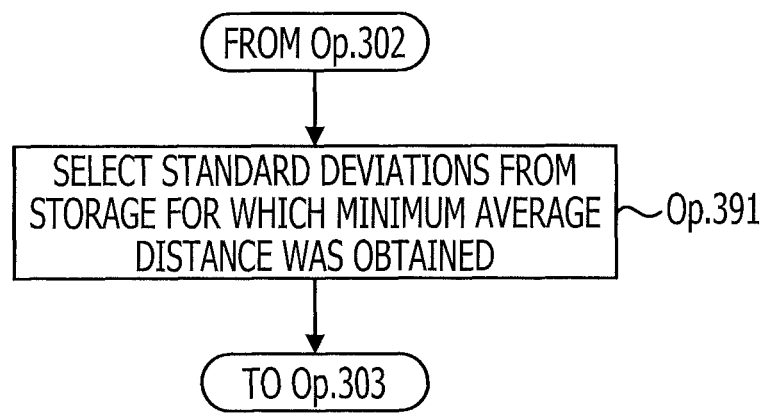
FIG. 15 is a flowchart illustrating partial processing operations in a second modification of a reference utterance data update process.

Op. 391 in FIG. 15 is executed in the case where the determination result is Yes in Op. 302 of FIG. 15. In this case, the updater 16 returns a determination result of Yes in Op. 302 if at least one of the average distances computed for each set is less than or equal to the second threshold.

In Op. 391, the updater 16 selects the set of default values having the minimum average distance from among the sets of default values for statistical quantities of feature parameters for reference utterance data discussed above, and then proceeds to Op. 303 in FIG. 13. The update operation in Op. 303 executed at this point is conducted on the set of default values that was selected in Op. 391.

Thus, by preparing plural sets of default values for statistical quantities of feature parameters for reference utterance data, the statistical quantities of feature parameters for reference utterance data can more rapidly approach those of the speaker for whom an abnormal state is to be detected.

Although the state detecting apparatus 10 of this embodiment is taken to be housed inside the communication apparatus 1 herein, it may instead be configured such that the state detecting apparatus 10 is provided in a base station that exchanges signals with the communication apparatus 1, for example. In this case, the state detecting apparatus 10 provided in the base station detects if the speaker (i.e., the user of the communication apparatus 1) is in an abnormal state, and if an abnormal state is detected, a signal expressing the detection result is transmitted to the communication apparatus 1. Additionally, in the case where such a signal expressing a detection result is received at the communication apparatus 1, the output unit 40 is made to output that detection result to notify the user.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A state detecting apparatus comprising:
a processor to execute
acquiring utterance data related to uttered speech,
computing a plurality of statistical quantities for feature parameters regarding features of the utterance data,
creating, on the basis of the plurality of statistical quantities regarding the utterance data and another plurality of statistical quantities regarding reference utterance data based on other uttered speech, pseudo-utterance data having at least one statistical quantity equal to a statistical quantity in the other plurality of statistical quantities,
computing a plurality of statistical quantities for synthetic utterance data synthesized on the basis of the pseudo-utterance data and the utterance data, and
determining, on the basis of a comparison between statistical quantities of the synthetic utterance data and statistical quantities of the reference utterance data, whether the speaker who produced the uttered speech is in a first state or a second state; and
a memory to store the reference utterance data.

2. The state detecting apparatus according to claim 1, wherein the processor computes the plurality of statistical quantities by taking the fundamental frequency and logarithmic power of the utterance data to be the feature parameters.

3. The state detecting apparatus according to claim 2, wherein the processor individually computes a time average and a standard deviation for each of the feature parameters as the statistical quantities.

4. The state detecting apparatus according to claim 3, wherein the processor creates pseudo-utterance data having a fundamental frequency whose time average or standard deviation is equal to the time average or standard deviation of the fundamental frequency in a plurality of frames included in the utterance data.

5. The state detecting apparatus according to claim 3, wherein the processor creates pseudo-utterance data having a logarithmic power whose time average or standard deviation is equal to the time average or standard deviation of the logarithmic power in a plurality of frames included in the utterance data.

6. The state detecting apparatus according to claim 3, wherein the processor determines whether the speaker is in the first state or the second state on the basis of the difference between the synthetic utterance data and the reference utterance data in a two-dimensional space defined by the standard deviation of the fundamental frequency and the standard deviation of the logarithmic power.

7. The state detecting apparatus according to claim 6, wherein
in the case where the difference is less than a first threshold value, the processor determines that the speaker is in the first state which resembles the state when the other uttered speech was uttered, and
in the case where the difference is equal to or greater than the first threshold value, the processor determines that the speaker is in the second state which does not resemble the state when the other uttered speech was uttered.

8. The state detecting apparatus according to claim 1, wherein the processor determines whether the speaker is in the first state or the second state while removing statistical quantities larger than a second threshold value from among the statistical quantities for a plurality of frames included in the utterance data.

9. The state detecting apparatus according to claim 1, wherein the processor additionally executes
updating the reference utterance data to other reference utterance data on the basis of the utterance data.

10. The state detecting apparatus according to claim 9, wherein the processor updates to the other reference data using the reference data in the case where the difference between the statistical quantities of the utterance data and the statistical quantities of the reference utterance data is less than a third threshold value.

11. A communication apparatus that communicates with other communication apparatus, comprising:
a processor to execute
acquiring utterance data related to uttered speech,
computing a plurality of statistical quantities for feature parameters regarding features of the utterance data,
creating, on the basis of the plurality of statistical quantities regarding the utterance data and another plurality of statistical quantities regarding reference utterance data based on other uttered speech, pseudo-utterance data having at least one statistical quantity equal to a statistical quantity in the other plurality of statistical quantities,
computing a plurality of statistical quantities for synthetic utterance data synthesized on the basis of the pseudo-utterance data and the utterance data,
determining, on the basis of a comparison between statistical quantities of the synthetic utterance data and statistical quantities of the reference utterance data, whether the speaker who produced the uttered speech is in a first state or a second state, and
outputting the determination result; and
a memory to store the reference utterance data.

12. A state detecting apparatus comprising:
an acquirer configured to acquire utterance data related to uttered speech;
a first computation unit configured to compute a plurality of statistical quantities for feature parameters regarding features of the utterance data;
a pseudo-utterance data creator configured to create, on the basis of the plurality of statistical quantities regarding the utterance data and another plurality of statistical quantities regarding reference utterance data based on other uttered speech, pseudo-utterance data having at least one statistical quantity equal to a statistical quantity in the other plurality of statistical quantities;
a second computation unit configured to compute a plurality of statistical quantities for synthetic utterance data synthesized on the basis of the pseudo-utterance data and the utterance data; and
a detector configured to determine, on the basis of a comparison between statistical quantities of the synthetic utterance data and statistical quantities of the reference utterance data, whether the speaker who produced the uttered speech is in a first state or a second state.

13. A method comprising:
acquiring utterance data related to uttered speech;
computing a plurality of statistical quantities for feature parameters regarding features of the utterance data,
creating, on the basis of the plurality of statistical quantities regarding the utterance data and another plurality of statistical quantities regarding reference utterance data based on other uttered speech, pseudo-utterance data having at least one statistical quantity equal to a statistical quantity in the other plurality of statistical quantities;
computing a plurality of statistical quantities for synthetic utterance data synthesized on the basis of the pseudo-utterance data and the utterance data; and
determining, by a processor, on the basis of a comparison between statistical quantities of the synthetic utterance data and statistical quantities of the reference utterance data, whether the speaker who produced the uttered speech is in a first state or a second state.

14. A non-transitory storage medium storing a state detecting program that causes the processor to execute the method of claim 13.

* * * * *